US010486058B2

(12) United States Patent
Bergant et al.

(10) Patent No.: US 10,486,058 B2
(45) Date of Patent: Nov. 26, 2019

(54) RANDOM MECHANICAL GENERATOR WITH FEEDBACK ADJUSTMENT FOR DICE GAMING SYSTEM

(71) Applicant: Interblock USA L.C., Las Vegas, NV (US)

(72) Inventors: Urban Bergant, Kamnik (SI); Ivo Žavbi, Kamnik (SI); Peter Krošelj, Kamnik (SI)

(73) Assignee: INTERBLOCK USA L.C., Las Vegas, NV (US)

( * ) Notice: Subject to any disclaimer, the term of this patent is extended or adjusted under 35 U.S.C. 154(b) by 128 days.

(21) Appl. No.: 15/715,944

(22) Filed: Sep. 26, 2017

(65) Prior Publication Data

US 2018/0111042 A1    Apr. 26, 2018

Related U.S. Application Data

(60) Provisional application No. 62/400,026, filed on Sep. 26, 2016.

(51) Int. Cl.
| A63F 9/04 | (2006.01) |
| G06K 7/10 | (2006.01) |
| A63F 9/24 | (2006.01) |
| G06K 19/08 | (2006.01) |

(52) U.S. Cl.
CPC .... *A63F 9/0406* (2013.01); *A63F 2009/2442* (2013.01); *A63F 2250/1026* (2013.01); *A63F 2250/1036* (2013.01); *A63F 2250/58* (2013.01); *G06K 7/10118* (2013.01); *G06K 7/10366* (2013.01); *G06K 19/08* (2013.01)

(58) Field of Classification Search
None
See application file for complete search history.

(56) References Cited

U.S. PATENT DOCUMENTS

2011/0018194 A1* 1/2011 Nicely ................. A63F 9/0406
273/145 CA

* cited by examiner

*Primary Examiner* — James S. McClellan
*Assistant Examiner* — Peter J Iannuzzi
(74) *Attorney, Agent, or Firm* — BakerHostetler

(57) ABSTRACT

Methods, systems, and devices are described herein for calibrating displacement of a platform for throwing dice in a dice gaming system. In one aspect, a method may include obtaining a configured platform displacement during a throw of one or more dice by the dice gaming system. The throw of the dice may be associated with at least one dice throw parameter. The method may also include measuring an actual platform displacement during the throw of dice by the dice gaming system, and comparing the configured platform displacement with the measured actual platform displacement to determine a displacement delta. The method may additionally include adjusting at least one dice throw parameter based on the comparison to decrease the displacement delta for future throws of the one or more dice.

22 Claims, 25 Drawing Sheets

RANDOM MECHANICAL GENERATOR WITH FEEDBACK ADJUSTMENT FOR DICE GAMING SYSTEM

CROSS-REFERENCE TO RELATED APPLICATIONS

This application claims priority to U.S. Provisional Application No. 62/400,026, filed Sep. 26, 2016, the entirety of which is incorporated herein by reference.

TECHNICAL FIELD

This disclosure relates generally to gaming systems, and more specifically to automatic gaming systems that implement dice, such as craps.

BACKGROUND

Gaming systems, and particularly automatic and/or electronic gaming systems, are becoming more common. Current gaming systems can automate many functions, so as to eliminate a dealer or human presence required to facilitate playing various games. One example of this is the game of craps. Current systems employ dice systems which can roll actual dice in a controlled environment, and get a reading from the dice to enable playing of games, such as craps, without a dealer. These systems, however, may have durability issues, introduce regulatory concerns regarding the randomness of the mechanical assembly, and may provide a user experience that can be improved upon.

SUMMARY

Illustrative examples of the disclosure include, without limitation, methods, systems, and various devices. In one aspect, a method may include obtaining a configured platform displacement during a throw of one or more dice by the dice gaming system. The throw of the dice may be associated with at least one dice throw parameter. The method may also include measuring an actual platform displacement during the throw of dice by the dice gaming system, and comparing the configured platform displacement with the measured actual platform displacement to determine a displacement delta. The method may additionally include adjusting at least one dice throw parameter based on the comparison to decrease the displacement delta for future throws of the one or more dice.

In some aspects, historic information of at least one previous throw of the dice may be obtained. In this scenario, adjusting the at least one dice throw parameter may be further based on the historic information. In some cases, the at least one dice throw parameter may include at least one of: a first upward force or acceleration, a second upward force or acceleration, a time between the first upward force or acceleration and the second upward force or acceleration, or at least one displacement between the first upward force or acceleration and the second upward force or acceleration.

In some aspects, the method may further include obtaining a configured dice throw height and measuring the dice throw height during the throw of the at least one dice. The configured dice height may be compared with the measured actual dice height to determine a dice throw delta. At least one of the dice throw parameter may be further adjusted based on the dice throw delta to decrease the dice throw delta. In one example, the at least one dice throw parameter may be generated randomly prior to the throw of the dice.

Other features of the systems and methods are described below. The features, functions, and advantages can be achieved independently in various examples or may be combined in yet other examples, further details of which can be seen with reference to the following description and drawings.

BRIEF DESCRIPTION OF THE DRAWINGS

Embodiments of the present disclosure will be described more fully hereinafter with reference to the accompanying drawings, in which.

DETAILED DESCRIPTION OF ILLUSTRATIVE EMBODIMENTS

Figure 1A:
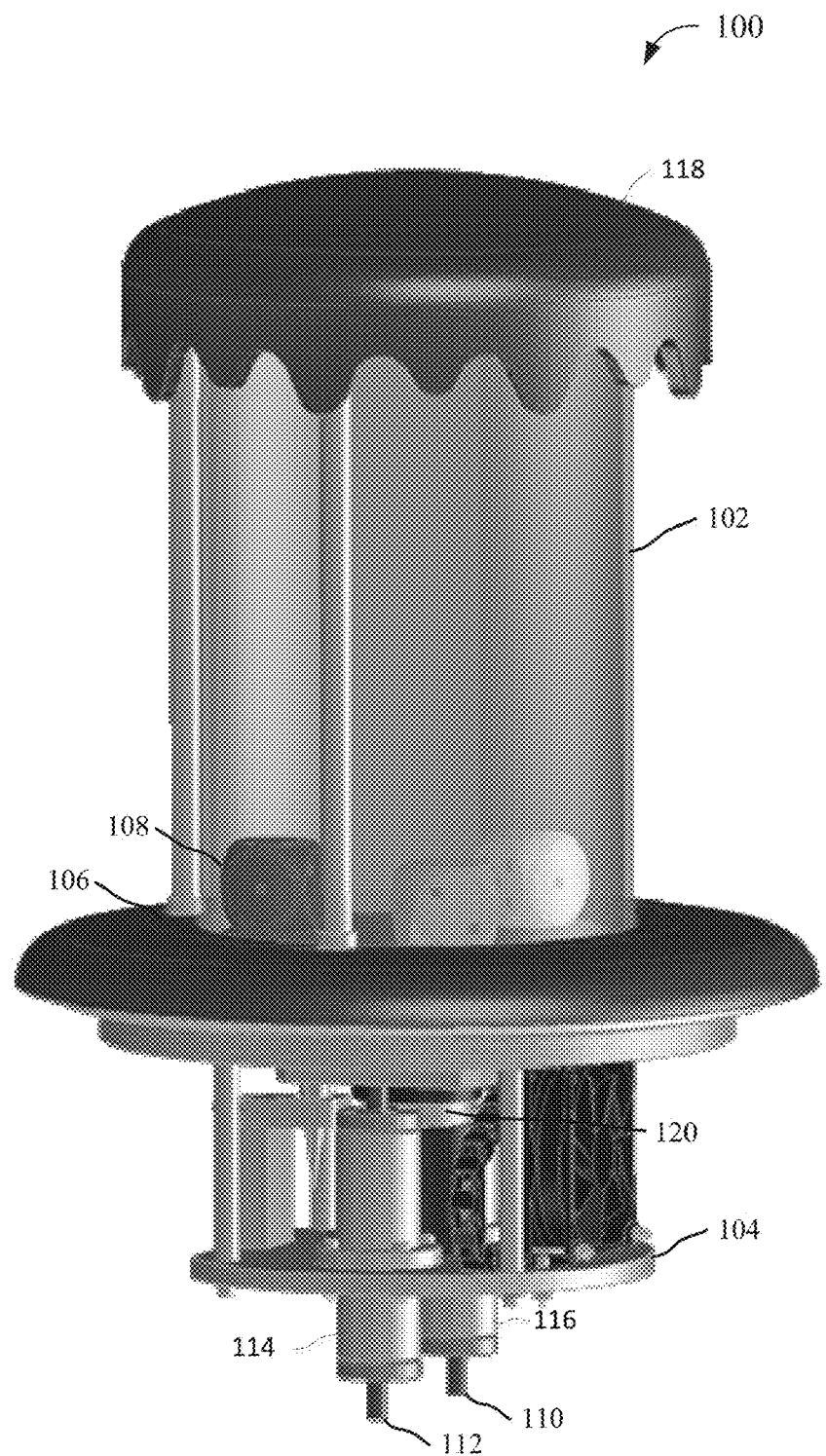
FIGS. 1A-1D and 2A-2D depict example diagrams of a dice system or generator for use with one or more gaming machines.
Figure 1B:
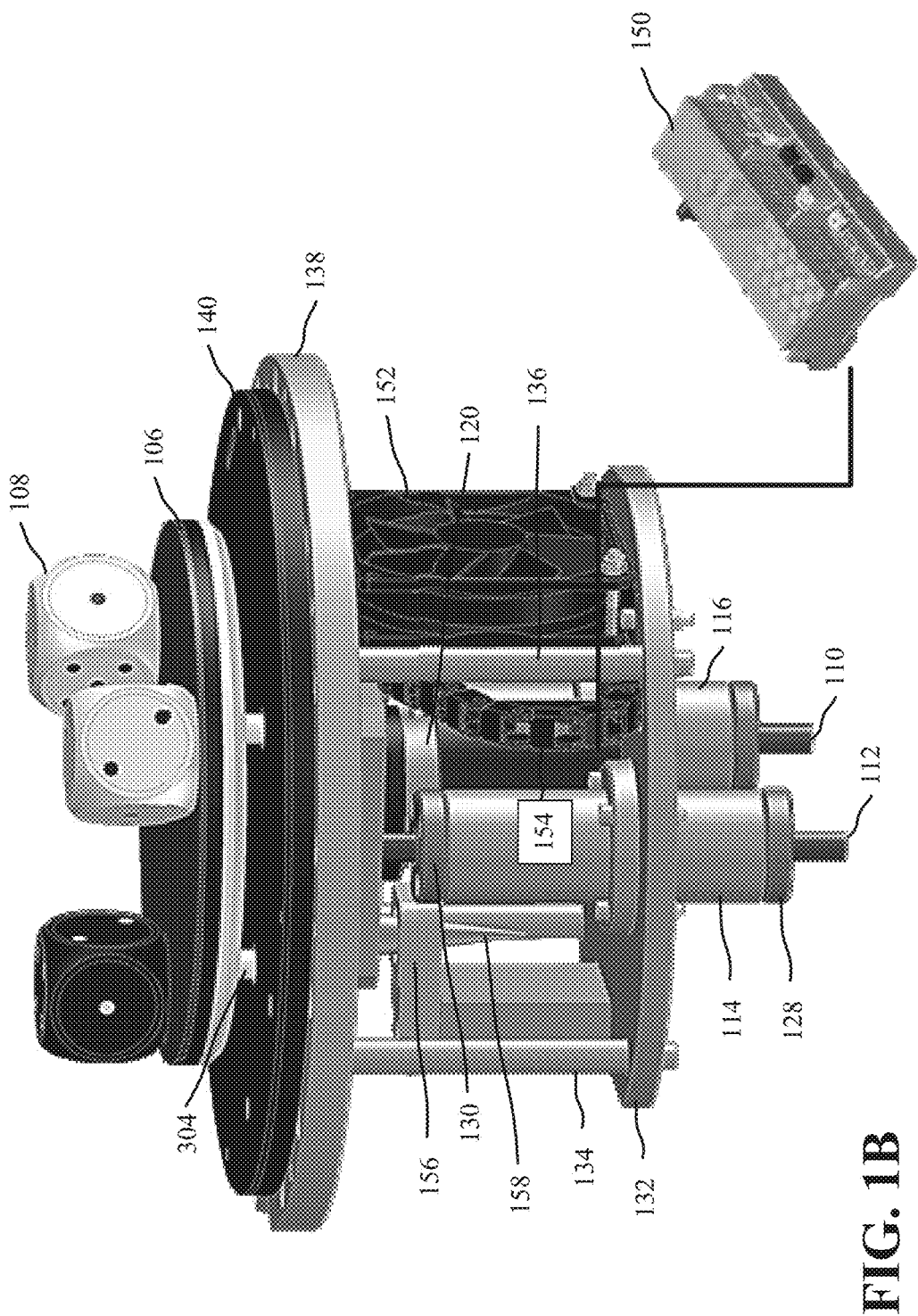
Figure 1C:
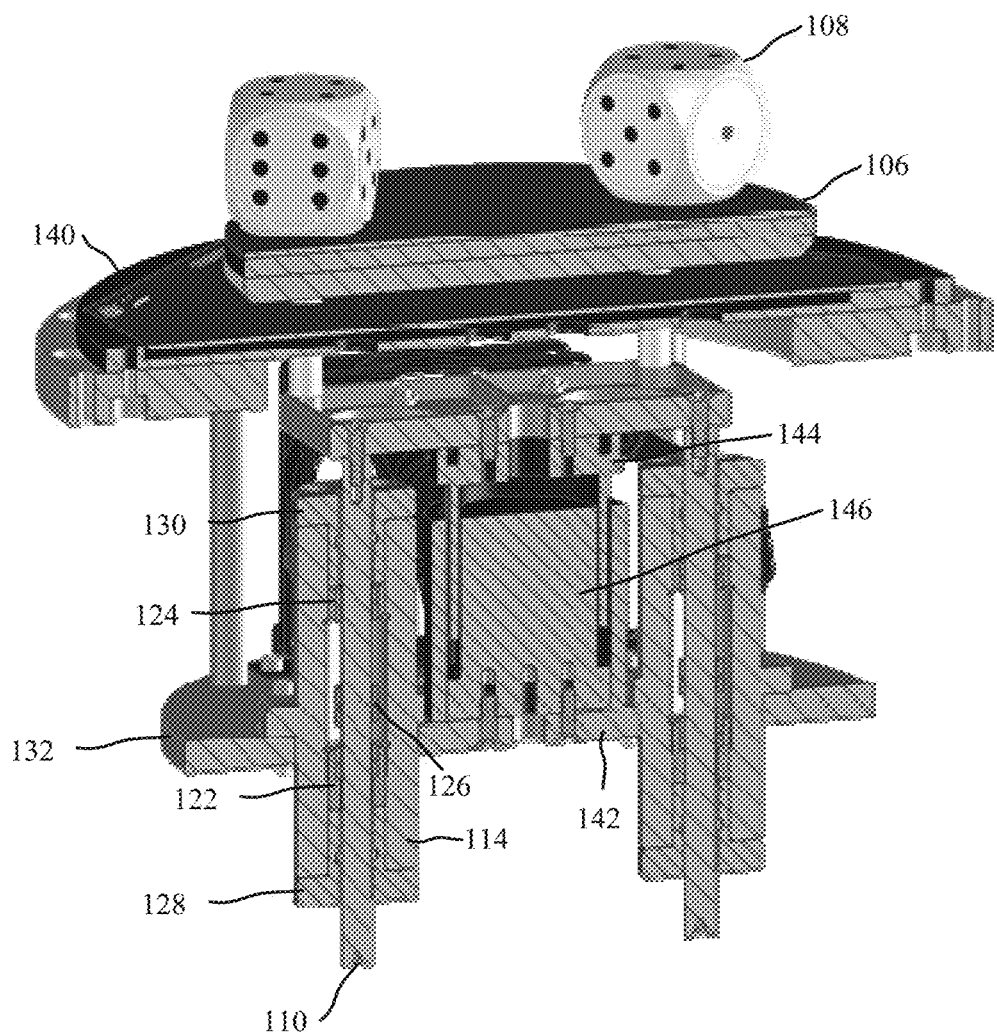
Figure 1D:
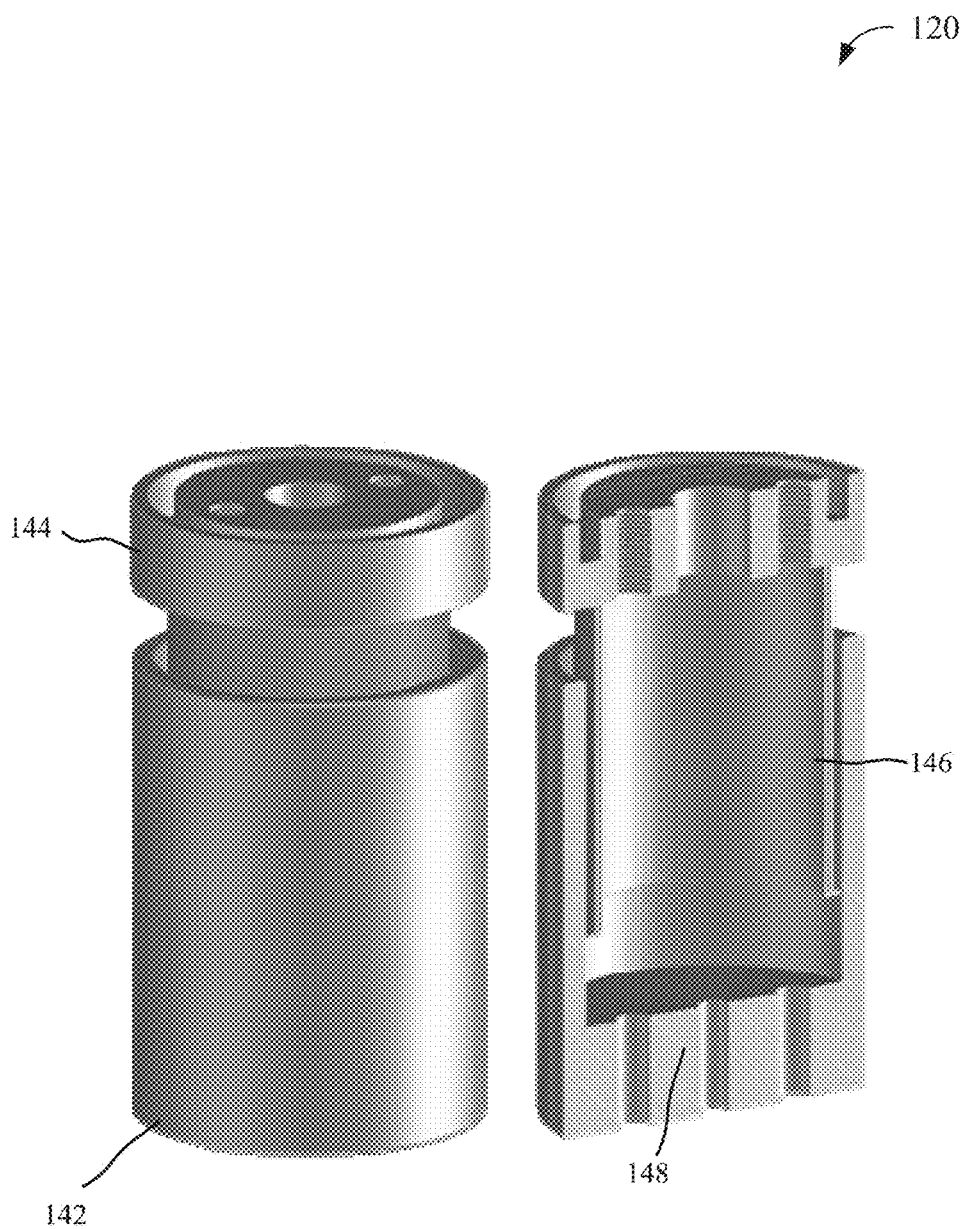

Systems and techniques are described herein for calibrating displacement of a platform for throwing dice in a dice gaming system

Dice System

FIGS. 1A, 1B, 1C and 1D depict an example dice system 100 that includes a dice canister 102 coupled to a platform 106 that is movable in the vertical direction by drive means 104. The dice canister 102 may be made of a transparent or partially transparent material, such as glass, plastic, etc. As further described below, the sides of the canister 102 may be covered with a smart film that can be controllable transparent, partially transparent or opaque. The dice canister 102 may enclose a space above platform 106, for example, to hold one or more dice 108. In some cases, the canister 102 may be removable from the platform 106, for example, to add or subtract dice, for maintenance, etc. The canister 102 may be reinforced with one or more vertical members, and may include a cap 118 that may include lighting, the wiring for which may be run up through supports for the canister 102 and cap 118. In some cases, the canister 102 and/or the cap 118 may be secured to the platform 106, for example, to prevent tampering with the dice 108 during play of a game using dice system 100.

The drive means or mechanism 104 may include a motor, such as a voice coil motor 120, that may drive the platform 106 and canister 102 up and down (e.g., in the vertical direction). In some aspects, the drive means 104 may include other types of motors. In some cases, the drive mechanism 104 may be configured to move the platform 106 upward, and may rely on gravity to move the platform 106 downward. However, in most implementations, the drive means 104 may be configured to move the platform both up and down, to control the forces applied to platform 106 so as to enable precise control of the throw of dice 108. This may enable the dice system 100 to guarantee that each dice roll or throw is random, such as to comply with one or more gaming licensing regulations.

Figure 3:
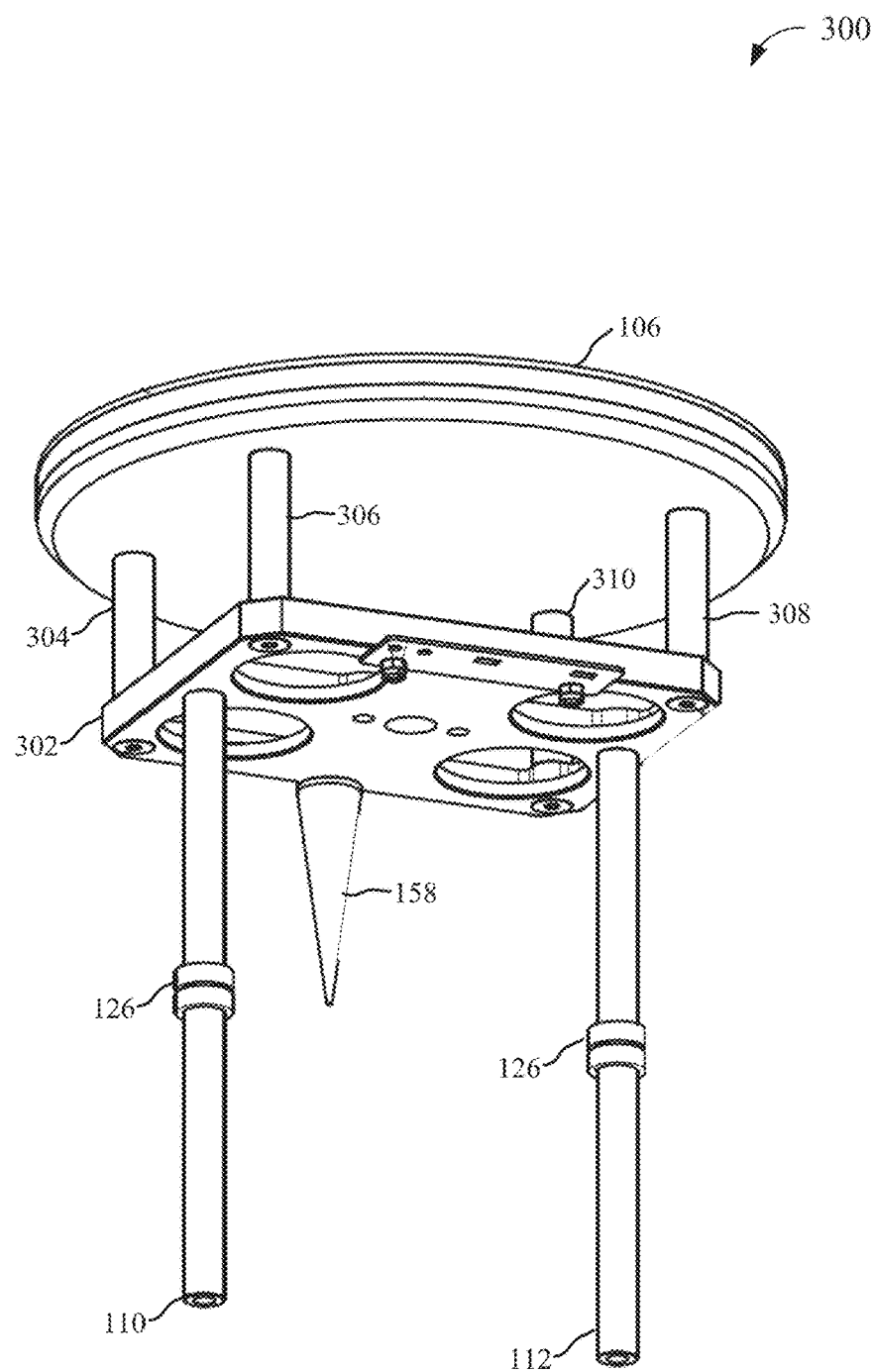
FIG. 3 depicts an example of a table assembly that may be used with a voice coil motor to move a platform configured to hold dice.

The drive means 104 may be fixed relative to the platform 106, to enable vertical movement of the platform 106 independently of the drive means 104 (e.g., so that the drive means 104 may remain stationary), thereby protecting the operation of the drive means 104. The platform 106 may be movable in at least the vertical direction via one or more support structures 304, 306, 308, 310 coupled to intermediary plate 302 (further described in FIG. 3), which is in turn coupled to the drive means 104. In the example illustrated, the platform 106 may also be coupled to two vertical shafts 110, 112. The shafts 110, 112 may move within sheaths or guides 114, 116 via one or more bearing or bushing assemblies, such as bearings 128, 130. The sheaths or outer cylinders 114, 116 may be fixed, for example to a base structure plate or platform 132, which remains stationary as the platform 106 moves up and down. An example of platform 106, coupled to shafts 110, 112 is illustrated in FIG. 3. Shafts 110, 112 may each have one or more magnets 126 attached thereto, which may be permanent magnetics. Sheaths 114, 116 may each include one or more magnets that function as magnetic movement limiters 122, 124. The magnetic movement limiters 122, 124 may be permanent magnetics. The magnetic movement limiters 122, 124 may be attached to an upper portion 130 and a lower portion 128 of each of sheaths 114, 116. The magnetic movement limiters 122, 124 may limit movement of shafts 110, 112 in the vertical direction via magnetic force, e.g., the magnet(s) 126 on each of shafts 110, 112 may be positioned to have an opposite polarization as magnetic movement limiters 122, 124.

In some aspects, the two shafts 110, 112 and upper and lower portions 128, 130 of the sheaths 114, 116 may form a guide system. Shafts 110, 112 may, in some cases, be coated with an oil-free lubricant (i.e., TEFLON), such that no oil is needed to help reduce wear and maintenance of the shafts 110, 112 and sheaths 114, 116. The magnets 122, 124 and 126 may cooperate together to limit mechanical movement of the shafts 110, 112. In some cases, one magnet 126 may be attached to one or more of shafts 110, 112. Magnetic movement limiters 122, 124 may be placed at the top and bottom of sheaths 114, 116, so as to limit the maximum vertical movement of magnet 126, which may be positioned in between limiters of the portions 128, 130, which may also include an oil-free lubrication system. In another example, shaft 110 and/or 112 may include two magnets 126, spaced a distance apart from each other along shafts 110, 112. Magnetic movement limiters 122, 124 and portions 128, 130 may be positioned in between magnets 126, such that the upper limiter 124 may limit downward movement of shaft 110, 112, and lower limiter 122 may limit upward movement of shaft 110, 112. The position of movement limiters 122, 124 and magnet(s) 126 may determine the minimum and maximum vertical position shafts 110, 112 and hence platform 106. It should be appreciated that the above described configurations of a magnetic braking system are only given by way of example. Other types of braking systems that similarly utilizes magnets are also contemplated herein.

The magnets (122, 124, 126) may replace prior systems, for example that utilized mechanical springs. By replacing the mechanical spring systems with magnetic brakes, reliability of the system may be increased. In some aspects, game cycle counters may be provided in system 100 that monitor usage of various components of system 100 and provide maintenance information of the components. The maintenance information may include lifetime and replacement information of dice 108, container 102, and other components, such as a vibration area of the platform 106, etc. In some aspects, the counters may provide a warning or indication that one or more components need to be replaced. With use of magnetic brakes, the maintenance interval of the braking system may be greatly increased.

In one example, using the magnetic brakes (122, 124, 126) may reduce the weight of platform 106, for example to 1.8 lbs (0.8 kg). As a result of the weight savings, the magnetic braking system may also reduce the power needed to move the platform in the vertical direction. The weight savings may also reduce the impact of vibrating the platform on surrounding systems, such as brackets, and other mechanical structures.

In some cases, the use of the magnetic brakes and/or drive means 104 may increase the height at which the dice can be thrown as well as reduce the time that is needed to throw dice 108 and to determine which dice 108 are facing upwards, so as to determine what score is associated with the throw, in less time than previous systems. Tables 1 and 2 below show experimental dice throw times for the described system, and for previous systems, for example, utilizing spring movement limiters.

TABLE 1

| | Comparing time spent in detection state and game cycle (in sec) | >99% of results | >95% of results | >90% of results | >50% of results | Fastest time | Average time |
|---|---|---|---|---|---|---|---|
| Detection state | Gen. 1 | 15.5 | 12.9 | 12.1 | 9.4 | 4.6 | 9.6 |
| | Gen. 2 | 7.0 | 5.1 | 4.4 | 2.7 | 1.15 | 2.9 |
| | Gen. 3 - 3 dice (42 mm) | 9.1 | 3.8 | 3.3 | 2.2 | 0.9 | 2.3 |
| | Gen. 3 - 2 dice (42 mm) | 4.8 | 3.2 | 2.8 | 1.8 | 0.6 | 1.9 |
| | Gen. 3 - 1 dice (53 mm) | 1.9 | 1.4 | 1.1 | 0.7 | 0.2 | 0.8 |
| Game cycle | Gen. 1 | 25.6 | 23.1 | 22.2 | 19.5 | 14.7 | 19.7 |
| | Gen. 2 | 14.1 | 12.4 | 11.7 | 10.0 | 8.5 | 10.2 |

TABLE 1-continued

| Comparing time spent in detection state and game cycle (in sec) | >99% of results | >95% of results | >90% of results | >50% of results | Fastest time | Average time |
|---|---|---|---|---|---|---|
| Gen. 3 - 3 dice (42 mm) | 5.6 | 7.3 | 6.7 | 5.5 | 4.2 | 5.6 |
| Gen. 3 - 2 dice (42 mm) | 8.2 | 6.6 | 6.2 | 5.2 | 4.0 | 5.3 |
| Gen. 3 - 1 dice (53 mm) | 5.5 | 5.0 | 4.7 | 4.3 | 3.8 | 4.4 |

TABLE 2

| $3^{rd}$ Generation Dice Generator with | Average detection time | Average game cycle time |
|---|---|---|
| 3 dice (42 mm) | 2.3 s | 5.6 s |
| 2 dice (42 mm) | 1.9 s | 5.3 s |
| 1 dice (53 mm) | 0.8 s | 4.4 s |

The magnet(s) 126 and magnetic movement limiters 122, 124 of each shaft or member may limit movement of the platform 106 in the vertical direction without utilizing springs or other similar systems of previous designs. As a result of using magnetic limiters, the described system may be more durable, last longer, require less maintenance, require less replacement of parts, etc. In some cases, the fixed portion of system 100 may include the drive means 104, which may include part of voice coil motor 120, a plate or platform 132 on which the sheaths 114, 116 and voice coil motor 120 is mounted, one or more supports 134, 136, that couple the plate 132 to an upper plate or platform 138, upon which an RFID detection device or plate (e.g., including a microcontroller) 140 may be placed, attached, mounted, etc. The RFID detection device 140 may detect the one or more dice 108, which may each include a number of RFID tags or chips. Each chip may correspond to a face of each dice 108 on which is displayed the pips of the dice 108. In some examples an RFID tag or chip for a given pip on a face, say a "2", may be located opposite the face showing a "2." In this way, when the die is laying on platform 106, and a "2" is facing upwards where players can see it, the RFID detection device 140 may detect the closest RFID tag as the one corresponding to the number "2." One implementation of an RFID system for detecting dice will be explained in greater detail below in reference to FIGS. 6 and 7.

In some cases, the drive means 104 may include a voice coil motor 120. Voice coil 120 may include a first cylinder or cylindrical portion 142, and a second cylindrical portion 144. Portion 144 may fit at least partially inside of cylinder portion 142. Portion 144 may be substantially hollow and may house windings 146, for example, made out of copper. Portion 142 may include a permanent magnet 148. Drive mechanism 104 may also include a power source 150, electrically connected to voice coil motor 120 for driving the voice coil motor 120. When current is applied to the voice coil motor 120 via power source 150, a magnetic field is produced. This magnetic field causes the voice coil motor 120 to react to the magnetic field produced by the permanent magnet 148 fixed to the portion 142, thereby moving the portion 144 of the motor 120. For example, driving current through the windings 146 in one direction may drive the portion 144 in one direction and driving current through the windings 146 in the opposite direction may drive the portion 144 in the opposite direction. Movement of the portion 144 may be highly controlled for micro-positioning in this manner. In some cases, the power source 150 may include voice coil driver module and/or voice coil driver for regulating control of the voice coil motor 120, and a UPS module for backup and power bursts. A more detailed example of power source 150 will be described below in reference to FIG. 4.

As the moving parts (i.e., portion 142 and its coil 146) of the voice coil motor 120 do not contact the stationary parts (i.e., portion 144 and its magnet 148), there is no mechanical wear on the voice coil 120 and there are no sensitive mechanical parts (wheels, straps, bearings, motor) required for creating fast dynamic movements. A voice coil motor 120 may also be chosen as it may be placed at a number of different locations in dice system 100 to effectuate vertical movement of platform 106, with minimal modification of other components. The voice coil motor 120 may also be configured to provide arbitrary movement frequency (e.g., up to 100 Hz), amplitude and offset, such that it may be completely customizable to different system 100 designs. In some cases, the voice coil motor 120 may vibrate the platform 106, for example across a wide frequency range, to settle the dice so that one face of each dice is facing upwards, to simulate rolling of the dice in a player's hand, and for other reasons. In some cases, the voice coil motor 120, in conjunction with other components of system 100 may enable throwing of dice 108 up to 14 inches or 35 cm above the platform 106, to simulate a player rolling the dice 108.

It should be appreciated, that other drive means 104 are contemplated herein, such that the described techniques may be implemented in a similar manner with these other drive means 104 (e.g., other motor types, in different physical configurations).

In some aspects, a fan 152 or other cooling mechanism may be provided proximate to the drive means 104, for example, to ensure safer and longer operation of drive means 104. In some cases, a flexible retention device 154, such as a hollow chain, may be used to hold wiring to the RFID detection device 140, so the wiring may be flexed each time the platform 106 moves without overly stressing the wiring.

In some aspects, system 100 may include a displacement sensor 156, for example, attached to plate 132. The platform 106 may be connected to a device or structure 158 that may move proximate to displacement sensor 156, for example, to enable measuring displacement of platform 106 relative to drive means 104 (or other fixed portions of system 100). During operation of the dice system 100, theoretical displacements of the platform 106 may be selected randomly by a random number generator associated with the power system 150 (either incorporated into the driving system of the power system or input to the driving system from another outside computer component). The theoretical displacements may be referred to as the stroke or throw of the dice that is desired. As further described below, the stroke or throw may involve multiple controlled movements of the platform 106 so as to achieve a desired throw of the dice. The displacement sensor 156, 158 may measure the actual displacements of the platform 106, which may be compared to the theoretical displacement, as more fully described below, in a form of a closed loop feedback system, so as to monitor and adjust the accuracy of the dice system 100 continually over time.

Figure 2A:
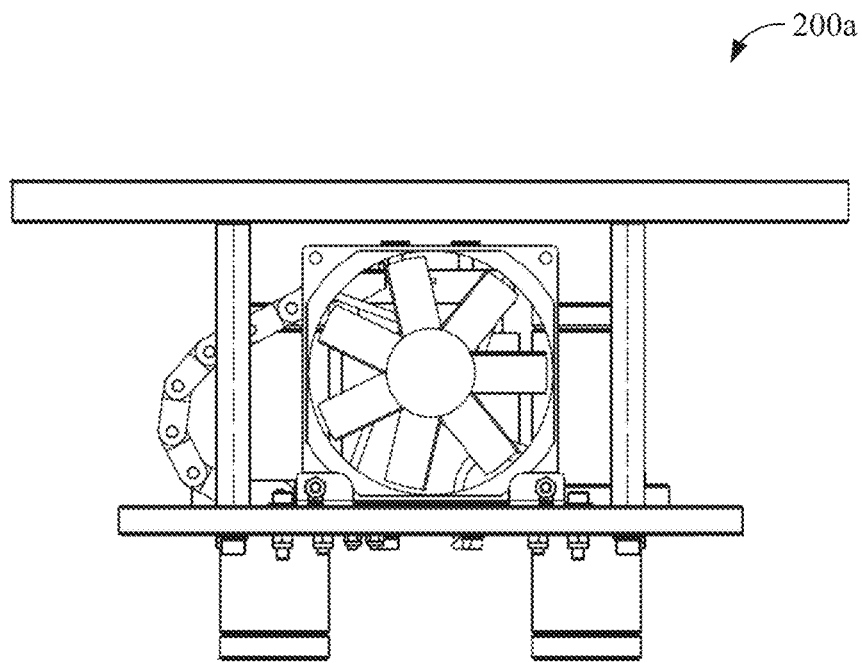
Figure 2B:
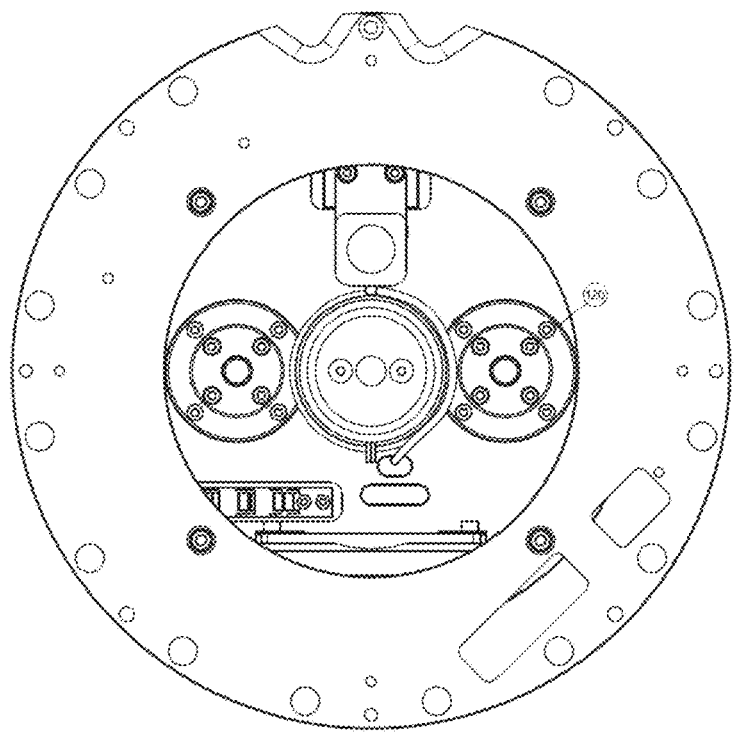
Figure 2C:
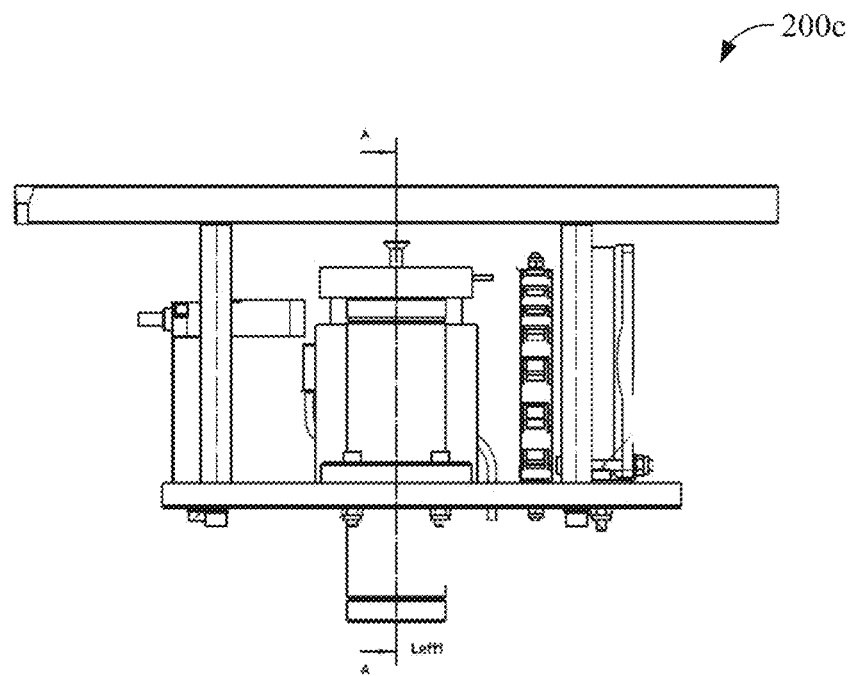
Figure 2D:
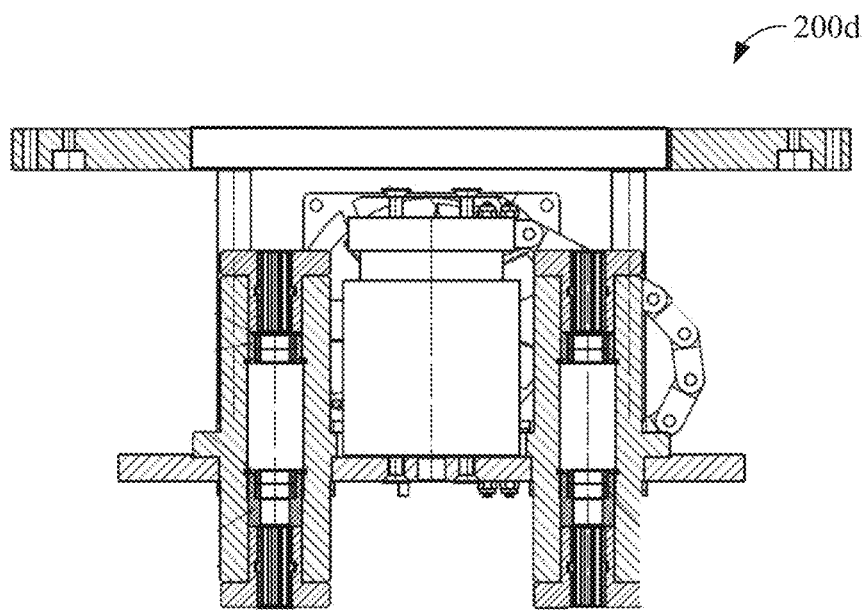

FIGS. 2A, 2B, 2C, and 2D depict perspective views of portions of system 100 of FIGS. 1A, 1B, 1C and 1D. FIG. 2A illustrates a front view 200a of drive means 104. FIG. 2B illustrates a top view 200b of drive means 104 and platform 106. FIG. 2C illustrates a side view 200c of drive means 104. FIG. 2D illustrates a cross-sectional side view 200d of drive means 104.

FIG. 3 depicts an example of a platform assembly 300 that may be moved in the vertical direction and/or vibrated by drive means 104. As illustrated, platform assembly 300 may include platform 106 and an intermediary plate 302 coupled to the platform 106 via a number of support structures 304, 306, 308, 310. Shafts 110, 112 may extend from the intermediary plate 302 away from the platform 106. A structure 158 used in conjunction with a displacement sensor 156 (not shown) for measuring displacement of the platform assembly 300 relative to drive means 104 may extend from the intermediary plate 302, away from platform 106.

In one example, portion 144 of voice coil motor 120 may attach to a surface of the intermediary plate 320 (e.g., a surface facing away from platform 106). Upon activation, the voice coil motor 120 may move the platform assembly 300 in the vertical direction and/or vibrate the platform assembly 300, with the shafts 110, 112 guided by sheaths 114, 116. The magnet(s) 126 attached to the shafts and the magnetic movement limiters 122, 124 may limit the vertical movement of the shafts 110, 112 and hence the platform assembly 300.

In some examples, RFID detector plate support structures 140 may have one or more holes or openings corresponding to support structures 304-310. In this way, platform assembly 300 may move vertically with respect to RFID detector plate 140, such that RFID detector plate 140 does not move with platform 106. As RFID detector plate 140 only needs to be able to read the RFID tags of the dice once the dice have settled on the bottom of the platform 106, the fact that RFID detector plate 140 does not move with platform 106 does not negatively impact operation of RFID detector plate 140.

Figure 4:
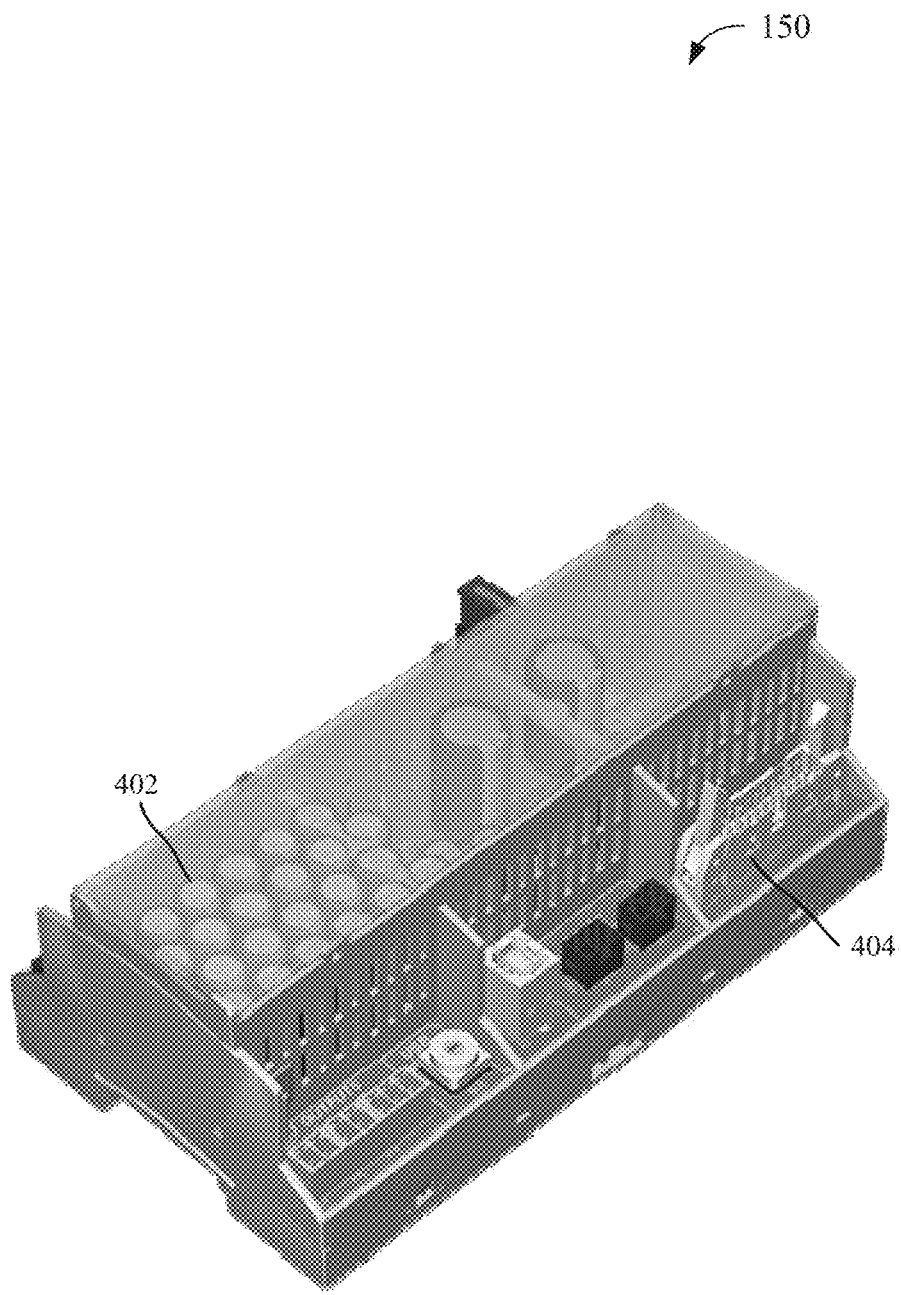
FIG. 4 depicts an example of a voice coil motor driver used to drive a platform to cause dice to move.

FIG. 4 depicts an example power system and drive control 150 for driving a voice coil motor of dice system 100. Power system/controller 150 may, via feedback from drive means 104/voice coil motor 120 and/or displacement sensor 156 and structure 158, determine an actual position of the platform 106 via the drive means/voice coil motor (e.g., vertical displacement of portion 144 relative to portion 144), for example, relative to the desired or instructed position or displacement. In this way, as noted above, the movement of the platform 106 via drive means 104/voice coil motor 120 can be calibrated, to increase accuracy, reliability and/or precision of throwing dice 108. An example process for calibrating drive means 104/voice coil motor 120 will be described in greater detail below in reference to FIG. 11.

In some aspects, the power system 150 may also control the precise movement of drive means 104/voice coil motor 120, to change the characteristics of movement of platform 106, to effectuate different throw characteristics of the dice 108. An example of different movements of platform 106 will be described in greater detail below in reference to FIG. 9. An example process for throwing dice 108 will be described in greater detail below in reference to FIG. 10 below.

In some aspects, power system/drive control 150 may also, via feedback from drive means/voice coil motor 120 and/or one or more temperature sensors, measure temperature of the drive means 104/voice coil motor 120 in operation. The power system 150 may monitor the temperature of drive means 104/voice coil motor 120 to ensure it does not overheat, potentially causing damage to drive means 104 and other components of dice system 100. Upon detecting an overheat condition, the power system 150 may temporarily cease providing power to drive means 104/voice coil motor 120 to prevent any damage being caused to drive means 104/voice coil motor 120. In some aspects, the power system 150 may resume supplying power to drive means 104/voice coil motor 120 upon expiration of a configurable time period, upon detection of a temperature of the drive means 104/voice coil motor 120 being within a safe operable range, and the like.

In some aspects, power system 150 may include a capacitor power bank 402 that may store energy for moving the platform 106. Capacitor power bank 402 may provide an uninterruptible power supply. Capacitor bank 402 may store energy, for example, that is provided by any number of conventional power supplies (e.g., 120V wall socket). In some cases, the capacitor bank 402 may store energy, and may provide the energy to the drive means 104/voice coil motor 120 for effectuating a roll or throw of dice 108. In some cases, capacitor bank 402 may store enough energy to effectuate one, two, or more additional jumps of the dice 108 via moving platform 106, for example, when the conventional power source is interrupted or a power failure occurs. In one example, a throw of the dice 108 may consume, on average, 12 W, with a max of up to 60 W. This may be a significant increase in power efficiency from prior systems, such as those that utilize a spring and/or other drive means, which may require up to 400 W. Power system 150, at least in part due to capacitor bank 402, may enable very fast platform movement, for example, by supplying a peak power of up to 1100 W. In some cases, power system 150 may utilize a 24 V low power design, such that no AC certification may be needed. It should be appreciated, that other types of power systems 150 are contemplated herein, that provide different ranges of power, operate at different voltages, and are configured with one or more different component (e.g., not utilizing a capacitor bank 402).

In some cases, power system 150 may have one or more communication ports 404, to enable configuration of power source via an external computing device, including, for example, the input of random number generator information. In some cases, power system 150 may include one or more wireless transmitters to enable wireless control of power system 150.

Figure 5:
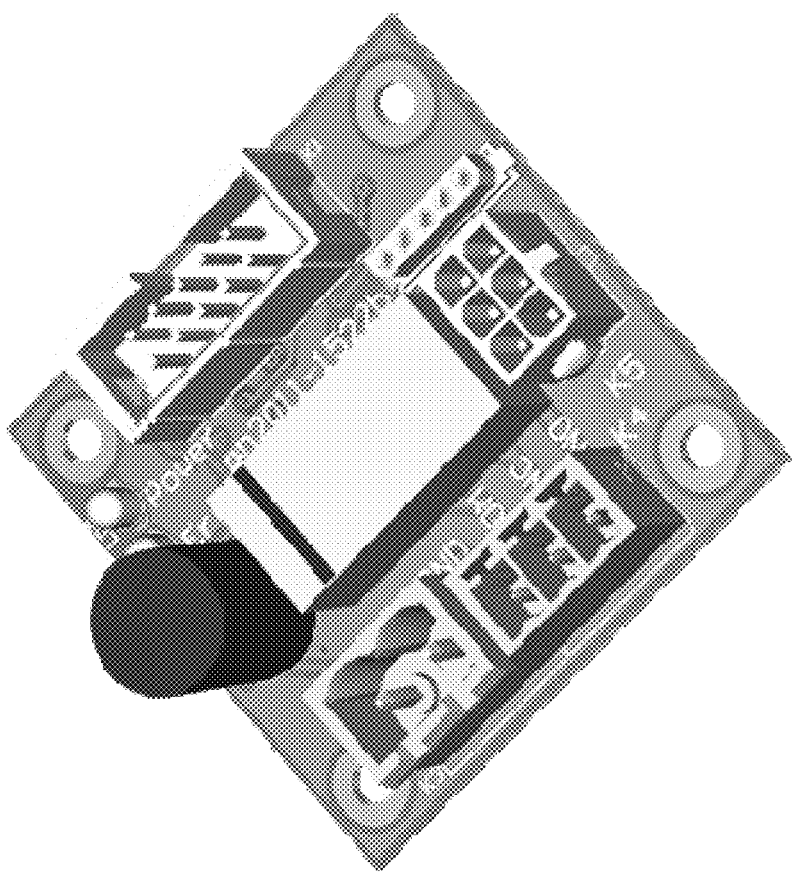
FIG. 5 depicts an example of a system for determining if a gaming machine is being inappropriately used (shaken or tilted).

FIG. 5 depicts an example gaming machine tilt detector interface 500. In some cases, it may be beneficial to protect against players shaking, tilting, or otherwise trying to physically and unfairly influence the play of one or more games using dice machine 100. The tilt detector interface 500 may detect movement of one or more portions of dice system 100, or a table holding dice system 100, in two or three dimensions, via various known techniques. In some cases, upon detecting a threshold tilt or movement of dice system 100 or the table to which it is connected to, tilt detection interface 500 may send a tilt signal to controller software associated with dice system 100 and the game may be immediately terminated. The tilt detector interface 500 may also send an indication to one or more authorities, for example, to have personal come to the location of the dice system 100 to ensure no damage is being done to the machine, players are not cheating, etc. In some cases, tilt detection system 500 may send an indication first to a controller or processor associated with the dice system 100, such as the communication ports 404 of the power system 150, which may then communicate with a centralized gaming management server system to alert authorities.

Dice Detection

Figure 6:
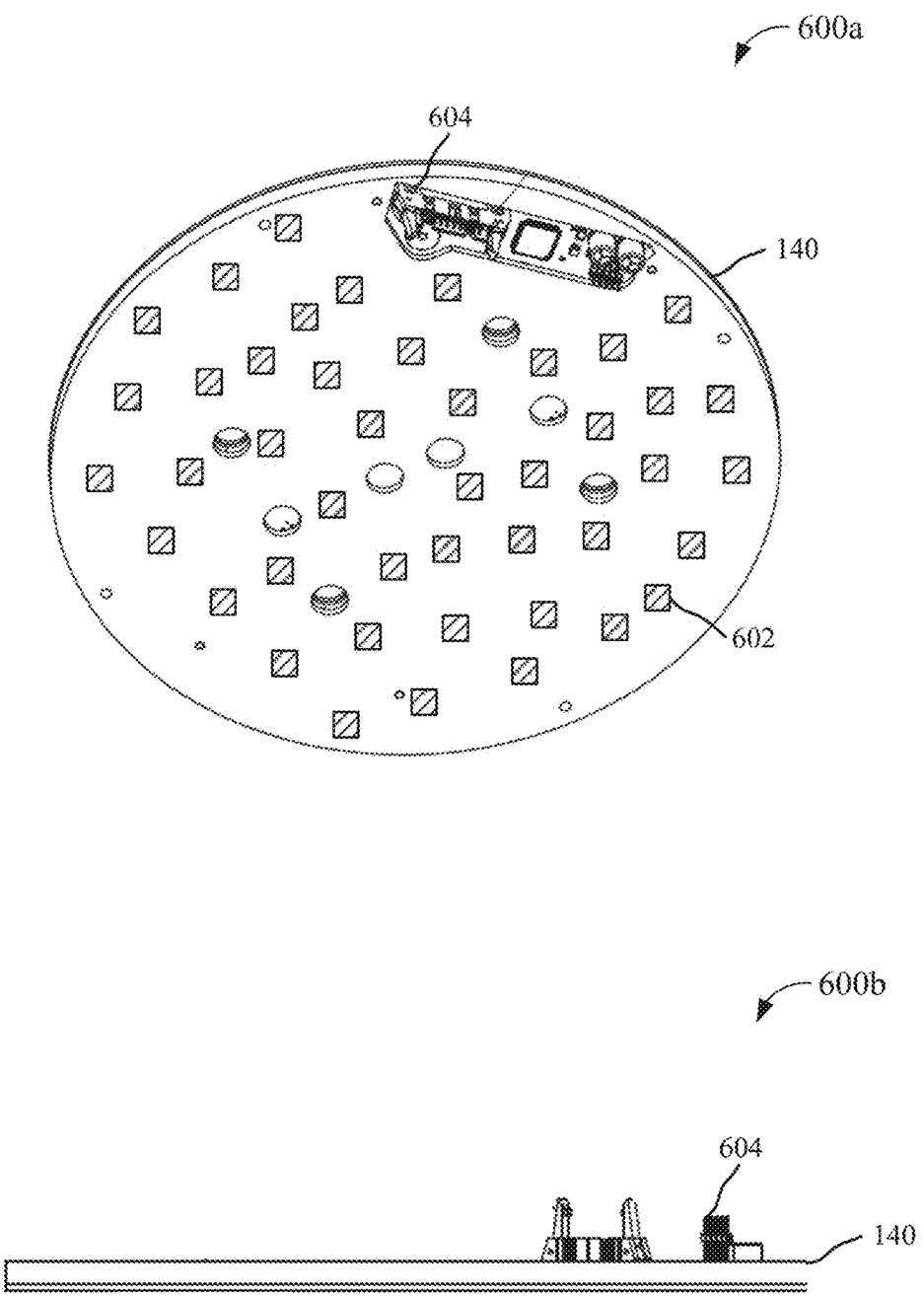
FIG. 6 depicts example perspective views of an RFID reader board that may be used to determine which face of one or more dice is facing upwards after a dice roll.

FIG. 6 depicts an example perspective view 600a and side view 600b of an RFID detection device 140 that may be used to determine which face of one or more dice is facing upwards after a dice roll. RFID detection device or reader 140 may include a plate or board, such as a single PCB board that may span at least the area of platform 106, and in some cases, a slightly larger area (as depicted in FIG. 1). In one example, the RFID detection device or board 140 may contain a plurality of RFID readers 602 (i.e., 44 readers, more or less) integrated with microcontroller 604, and may support the detection of at least 6 different dice 108. The position and spacing of RFID readers 602 on board 140 may be uniform, selected based on best detection criteria, concentrated in the center of board 140 based on a likelihood that dice will more likely rest around the center after a throw, or based on other criteria. In other designs, a different number of RFID readers may be utilized to detect the same or a different number of dice, with the number of readers configurable based on time desired for dice detection, cost, processing capabilities, and so on. In one example, RFID reader may support detection of one, two or three 1.65 in (42 mm) dice, or one 2.05 in (53 mm) dice.

Figure 7:
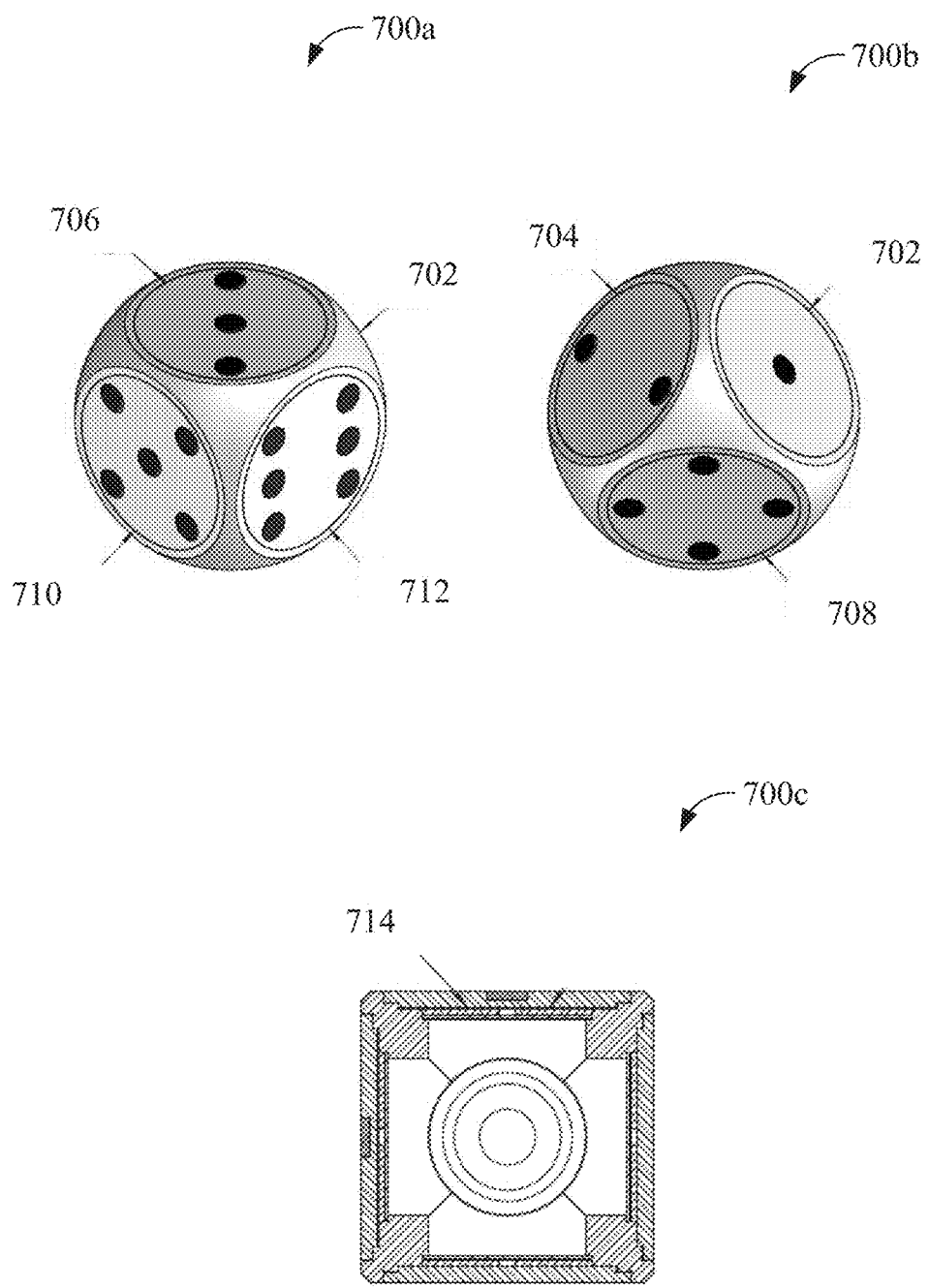
FIG. 7 depicts examples of dice that may be used in conjunction with the RFID reader board of FIG. 6.

FIG. 7 depicts different views 700a, 700b and 700c of a dice 108 that may be used in conjunction with the RFID reader of FIG. 6. As illustrated, dice 108 may have 6 sides or faces 702, 704, 706, 708, 710 and 712, with pips 1 to 6 appearing on the faces 702, 704, 706, 708, 710 and 712. Each face may correspond to an RFID tag 714, which is located on the opposite face of the pip to which it corresponds. The dice may have rounded edges so as to enable the dice to roll more easily and to reduce cocking, as further described below.

Each RFID reader 602 on RFID device 140 may transmit power within a short range of the RFID reader 602. If one or more tags 714, which are constructed within dice 108, are located within range of an RFID reader 140, the power will activate the circuitry of the one or more tags 714 and cause the one or more tags to transmit one or more signals that uniquely identify each tag 714. The distance of a particular tag 714, corresponding to one of faces 702, 704, 706, 708, 710 or 712 of dice 108, may correspond to the strength of the signal received by the one or more of the RFID readers 602. Based on the signal strength (RSSI) of RFID tags 714 received by one or more RFID readers 602, the distance to the one or more tags 714 may be determined. In other cases, time difference of arrival from two or more tags 714 may be used to calculate distance. In either case, from this distance information, a machine learning algorithm may determine which of the dice are lying in the upright position (e.g., facing upwards). In some examples, each tag 714 may have a code that corresponds to a particular dice and a particular face or pip 702, 704, 706, 708, 710 and 712 of the dice 108. In this way, the position and/or orientation of multiple faces of a signal dice 108 may be determined, and multiple measurements may be taken and the upward face of multiple dice may be determined concurrently and quickly.

In some cases, based on multiple RFID tag readings, the inclination angle of one or more dice may be determined, for example, when a dice lands after a throw in a cocked position such that no single face is facing upward. In one example, if this condition is detected, for example, based on RFID signal strengths detected by RFID readers 602, a control signal may be sent to drive means 104 to vibrate or otherwise move the platform 106, so as to settle the dice 108 so that each face of the dice 108 is facing upwards. In some cases, if after one attempt to settle the dice is unsuccessful (e.g., an inclination angle is again detected relative to a dice 108, the dice throw may be nulled, and a new dice throw may be initiated or indicated. In some cases, detecting a cocked condition may include determining two inclination angles for one dice (e.g., from two faces of dice 108).

Figure 8:
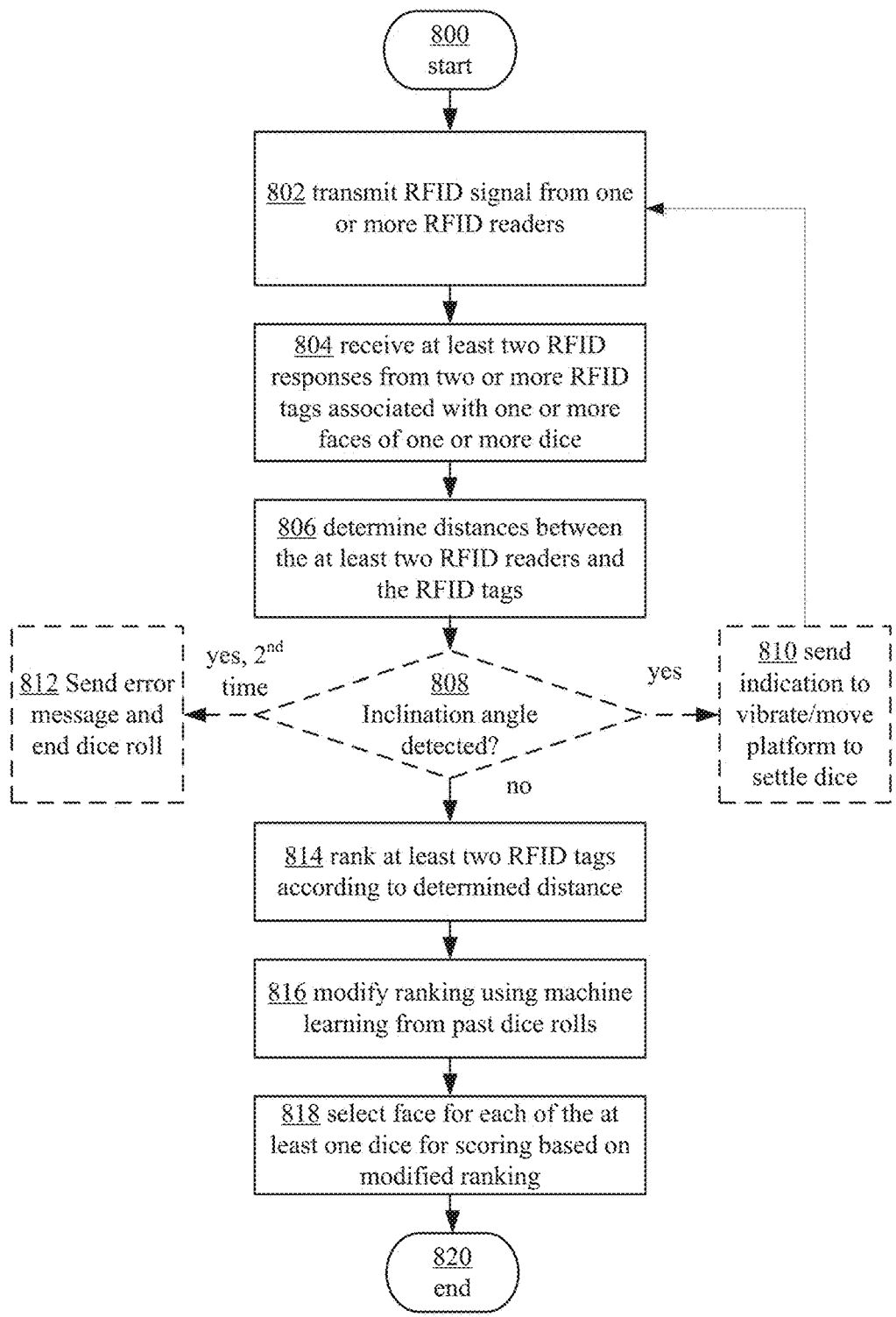
FIG. 8 depicts an example process for determining which face of a dice is facing upwards using RFID reader board.

FIG. 8 depicts an example process 800 for determining which face of a dice is facing upwards using RFID reader or detector 140 and dice 108. Process 800 may be performed by a controller system or processor associated with dice system 100, in combination with RFID reader 400 and dice 108.

In one example, process 800 may begin at operation 802, in which an RFID power signal may be transmitted by at least one of RFID readers 602. In most cases, most or all of RFID readers 602 will transit an RFID power signal, for example, after dice 108 have been thrown or rolled by system 100. Next, at operation 804, at least two RFID response signals may be received, by RFID board 140/RFID readers 602 from RFID tags 714 associated with one or more dice 108. As known in the art and briefly described above, upon receiving a signal, an RFID tag may transmit a unique signal indicating its identity using in part the received signal power, such that the tag it considered passive and requires no dedicated power source. Each response may indicate, via a unique number, for example, the face 702, 704, 706, 708, 710 and 712 and which dice 108 to which it is associated with. As described above, a tag may be located on the opposite face from which it is associated with, so as to be closest to the RFID reader to indicate an upward face of the dice. The distance of each tag response, and hence each tag or face, from the RFID readers may then be determined at operation 806.

In some examples, and by all means, not all examples, process 800 may additionally include operations 808, 810, and 812. At operation 808, it may be determined if an inclination angle of one or more dice is detected, indicating that the one or more dice are cocked or not resting on a single face or not all of the dice can be read, which may indicate that one dice is resting on top of another dice. If an inclination angle is detected or an expected reading from a dice is missing, process 800 may continue to operation 810, where an indication that a dice is cocked or missing may be sent to effectuate vibrating or other moving platform 106 to jostle and otherwise settle the dice (e.g., by activating drive means 104/voice coil motor 120). Process 800 may then loop back and repeat operations 802, 804 and 806. Operation 808 may be performed again, and if one or more dice are still misaligned/cocked/missing, process 800 may proceed to operation 812, where an error message may be sent to the controller of dice system 100 and result in the dice throw being ended or terminated. In such a case, the game may continue with the same bets and the dice may just be rolled again, or the game may be terminated, all of the bets cancelled and game restarted.

If, either on the first loop or the second loop of operations 802, 804, 806 and/or 808, and 810, no dice are detected as having an inclination angle or are missing, process 800 may proceed to operation 814. In other cases, for example, where operations 808, 812, and 814 are not performed, immediately upon the completion of operation 806, process 800 may proceed to operation 814. At operation 814, all RFID tag readings, corresponding to responses received at operation 804, may be ranked according to an estimated distance from a proximate or closest RFID reader 602, via techniques known in the art (e.g., RSSI, time difference of arrival, etc.).

Next, at operation 816, the ranking of RFID tags, and hence faces of the dice that are facing upwards, may be modified using machine learning techniques based on previous dice rolls and results. In some cases, system 100 may utilize one or more cameras for detecting the faces of dice resulting after one or more throws, for example, to verify that the face detected via RFID is the actual face resulting from the throw (e.g., providing a feedback loop). This information may be used to associate an accuracy value or weight to various determinations of dice rolls based on, for example, location of one or more dice relative to RFID board 140/platform 106, number of dice thrown at the same time, and other relevant factors. The accuracy value or weight may then be combined with RFID tag distances, for example, based on one or more similarities in characteristics between the current dice roll and past dice rolls. The weighted RFID tag distances may then re-ranked. Similarly, distance information associated with cocked dice may also be used to derive values or weights that improve future determinations of cocked or inclined dice. Next, at operation 818, a face for each dice may be selected as the resulting score, and the results communicated to a controller of system 100, whereby process 800 may end at 820. In some cases, operations 808, 810, and/or 812 may be performed after the re-ranking performed at operation 816. In other cases, operation 808 may be modified by or based on prior dice roll data/machine leaning techniques in a similar manner. In some examples, if either at operation 814 or 816, a closest face may not be determined, operation 810 or 812 may subsequently be performed.

Process 800 may provide an efficient way to determine the score of a dice roll, and for example, may contribute to reducing the amount of time required by system 100 to roll and score a dice roll.

Dice Throw Control

Figure 9:
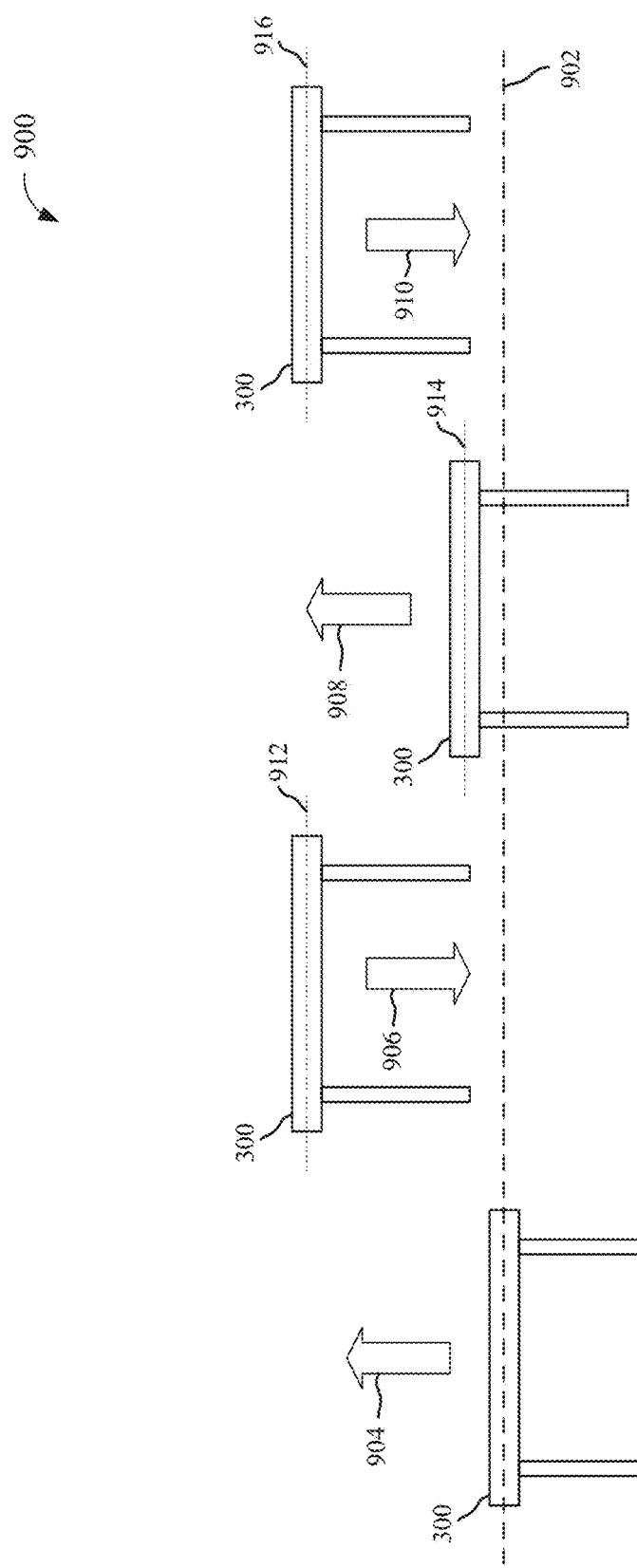
FIG. 9 depicts an example diagram of movement of a platform for throwing dice.

FIG. 9 depicts an example diagram 900 of movements of platform 106/platform assembly 300 controlled by drive means 104. In one example, to effectuate a throw of dice 108, drive means 104/voice coil motor 120 (via control of power system 150) may move platform assembly 300 upward, accelerating to the extent necessary to lift the dice off of platform 106 so as to begin a roll of the dice. In some cases, the amount of energy or power provided to drive means 104/voce coil motor 120 may determine how fast platform 106 accelerates, and hence how far dice are thrown above platform 106. In some cases, however, it may be more efficient and otherwise beneficial (e.g., provide a more engaging user experience/simulate a harder or more vigorous dice throw) to throw the dice via more than one upward acceleration of platform 106.

As illustrated in FIG. 9, dotted line 902 may represent a resting position of platform 106/platform assembly 300. As described above, a single acceleration of the platform assembly 300 in the upward direction to roll the dice may be represented by arrow 904. Either via the magnetic limiters 122, 124 described above, or via downward acceleration or reverse acceleration by drive means 104/VCM 120, the platform assembly 300 may hit a maximum height of 912. And return to resting position 902 at operation 906. The acceleration and/or the max height 912 may determine the height by which the dice rise above platform assembly 300 during the dice throw.

In some cases, a higher maximum height of dice resulting from a dice throw may be desired. In these cases, the drive means may be controlled, for example via power system 150, to produce two upward accelerations of the platform. The platform assembly 300 may first be accelerated upward at operation 904, for example, to an intermediate height 912 (e.g., not the max height of the system). The platform assembly 300 may then sink or move downwards, at operation 906, to a second intermediate height 914. In some cases height 914 may be the resting height 902. Operation 906 may be performed via gravity naturally causing the platform assembly 300 to return to the resting position 902, by reversing the direction of drive means 104, and/or by magnetic braking. Upon reaching intermediate height 914, the platform assembly 300 may again be accelerated in the upward direction, at operation 908, to height 916, which in some cases, may be the max height of the system. After reaching height 916, the platform assembly 300 may return to resting height 902 at operation 910, via one or more of gravity, reverse operation of drive means 104, or magnetic braking.

In some cases, before the platform is accelerated initially upwards, the platform may be vibrated by the drive means, for example, to simulate the slight rolling of the dice in a player's hand prior to throwing the dice during a real dice game played by a player actually physically throwing dice. Upon accelerating to height 912, the dice may stay on the platform or slightly jump up above the platform. Upon reaching height 916, the dice may jump or move to the highest height before returning to platform 916, which may then be in resting position 902 or slightly vibrating so as to enable the dice to settle faster without one dice sitting on another or any of the dice being cocked. One or more of the first or second intermediate heights 912, 914, the maximum height 916, the initial acceleration 904, the downward acceleration 906, or the second upward acceleration 908 may be modified or configured to determine how high the dice will jump. In one example, by utilizing a final max height 916 of ½ inch, with proper timing or positioning of the second operation 908, a maximum dice throw height of 14 inches may be achieved. In other examples, the timing between activating the two upward accelerations 904 and 908 may also be adjusted to configure the dice throw height. In other examples, the height 914 may similarly be used to configure the dice throw height.

The stroke of the platform assembly 300, which determines the height of the dice throw, may be predetermined. There may as little as two predetermined strokes and an unlimited number of predetermined strokes. In an aspect, there may be ten predetermined strokes, each of which may be randomly selected by a random number generator associated the drive means 104/VCM 120. As further described below with respect to FIG. 14B, the user interface may allow a player to be the shooter, either by touching the screen or using some other type of input control device, to indicate an intended throw of the dice. This may involve a player simply pushing a button on the display screen or providing some indication of force. So as to prevent a player from attempting to manipulate the outcome of a throw, regardless of how the player indicates the intended throw, the stroke of the platform will either be a minimum predetermined stroke, a maximum predetermined stroke, or even a randomly selected predetermined stroke among the ten predetermined strokes.

Figure 10:
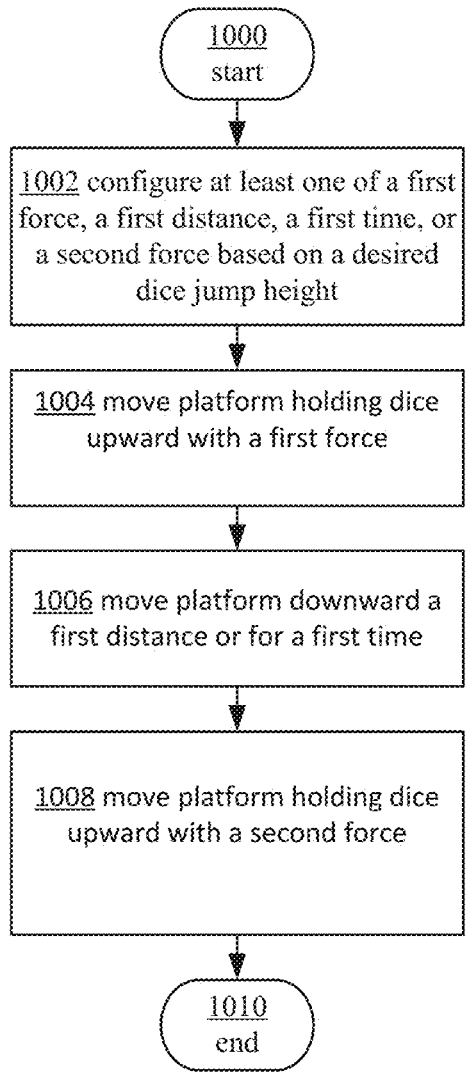
FIG. 10 depicts an example process for controlling the movement of a platform to throw dice.

FIG. 10 depicts an example process for controlling the movement of platform 106/platform assembly 300, for example, by power system 150 and drive means 104/VCM 120. As used herein, process 1000 may be called stroke regulation. At operation 1002, at least one of a first force, a first distance, a first time, or a second force based on a desired dice jump height is configured. The parameters of this configuration may be obtained from the random number generator. For example, the ultimate height and/or duration of a dice throw may correspond to a number between 1 and 10. The random number generator may select any number between 1 and 10 (or other larger range of numbers, for example) before each throw of the dice. The randomly selected number may then be input to power system 150, which sets the parameters for each movement of the drive means 104/VCM 120 and the distance and/or timing between dice heights or movements. This combination of movements/timings/distances set by the parameters determine the height and duration of the throw, which may or may not include pre-throw vibration and post-throw vibration. Hence, if the random number generator outputs a 3, the dice will be thrown differently than if the random number generator outputs a 7.

At operation 1004, the platform 106/platform assembly 300 holding the dice is then moved upward with the first force. At operation 1006, the platform 106/platform assembly 300 is moved or allowed to fall downward a first distance or over a first time period, which may be due to gravity, the drive means 104/VCM 120 or magnetic braking. At operation 1008, the platform 106/platform assembly 300 is moved upward with a second force to achieve the randomly determined height/duration of the stroke/throw.

Figure 11:
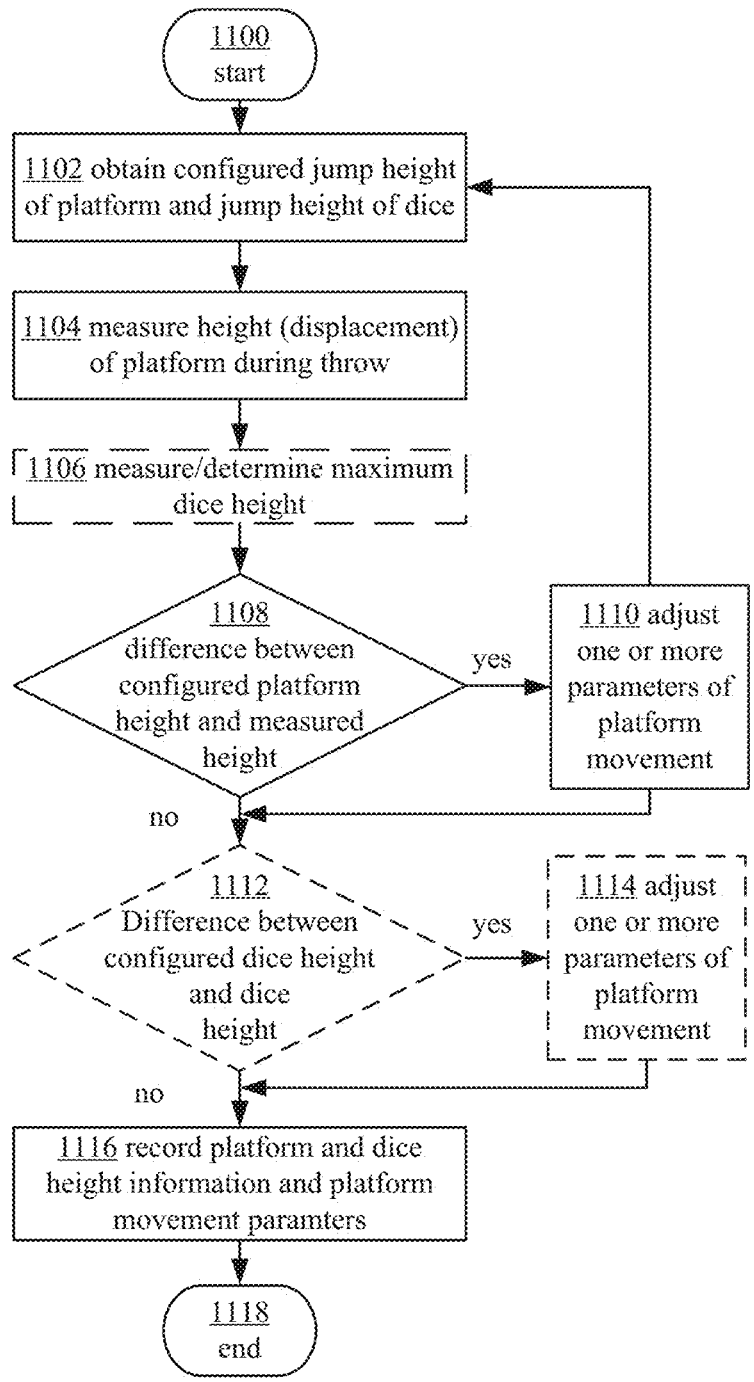
FIG. 11 depicts an example process for adjusting control of the drive means to calibrate the amount of displacement traveled by a platform to throw dice.

FIG. 11 depicts an example process 1100 for adjusting stroke control of the drive means to calibrate the amount of displacement traveled by platform 106/platform assembly 300. Process 1100 may enable sufficient control of movement of platform 106/platform assembly 300, through calibration, to meet one or more requirements of gaming control agencies to guarantee that the roll of the dice is truly random. In one sense, the way in which the drive means/VCM 120 moves platform 106/platform assembly 300 to cause a dice throw can be considered a mechanical random number generator. By showing sufficient control of the random number generator, randomness may be ensured to prevent the gaming house or organization from modifying the odds of the game unfairly in the house's favor or to prevent players from being able to anticipate the outcome of a throw. Jiggling the dice at the end of a throw may also further guarantee sufficient randomness in the outcome.

In some aspect, as previously described, process 1100 may utilize displacement sensor/structure 156, 158 described above in reference to FIGS. 1A, 1B, 1C and 1D and FIG. 3. In one example, process 1100 may be performed by power system 150 and/or one or more controllers or computing devices in communication with power system 150. Process 1100 may represent a closed feedback loop for calibrating one or more jump parameters of dice system 100

In the example illustrated, process 1100 may begin at operation 1102, in which the randomly configured jump height of the platform and/or of the dice may be obtained, for example, from a controller of dice system 100. The dice may then be thrown or rolled accordingly. The height or displacement of the platform may be measured at operation 1104. Operation 1104 may utilize displacement sensor 156, 158 as descried above. In some implementations of process 1100, the maximum dice height may also be measured, at operation 1106. In some cases, operation 1106 may require the use of cameras, optical sensors, or other sensing devices, to obtain information for measuring or determining the maximum height of the die. In one example, the height of the dice may be determined from one or more optical sensors or one or more pressure sensors on the platform, for example that can detect a time period when the dice is not in contact with the platform. In this case, the total time the dice is not contacting the platform may be used with information concerning the acceleration of the platform to determine the height of the dice. In some cases, operation 1106 may not be performed for every dice throw, such as for every one out of N number of dice rolls.

At operation 1108, the configured platform jump height and the actual measured jump height may be compared. If there is a difference between the two values or a difference that is greater than a configurable threshold, process 1100 may proceed to operation 1110, where one or more parameters of the platform movement may be adjusted to reduce and/or eliminate the difference or error. The one or more parameters may include any of the parameters described above for controlling the movement of the platform, such as first and second upward forces, a one or more intermediary heights, etc.

Once the one or more parameters have been adjusted at operation 1110, or if there was no error to begin with, and the max dice jump was measured/determined at operation 1106, process 1100 may continue to operation 1112, where it may be determined if there is any error or difference between the configured dice jump and the measured dice jump. If there is a difference, or a difference greater than a configurable threshold, process 1100 may continue to operation 1114, where one or more parameters of the platform movement may be adjusted to reduce and/or eliminate the difference or error. The one or more parameters may include any of the parameters described above for controlling the movement of the platform, such as first and second upward forces and one or more intermediary heights, distances, times, etc. Upon adjusting the one or more parameters, or if there was no dice jump height error, process 1100 may continue to operation 1116, where the adjusted parameters, and the height values may be recorded, for example, for future calibration and comparison. Process 1100 may then end at 1118.

Dice Selection

Figure 12:
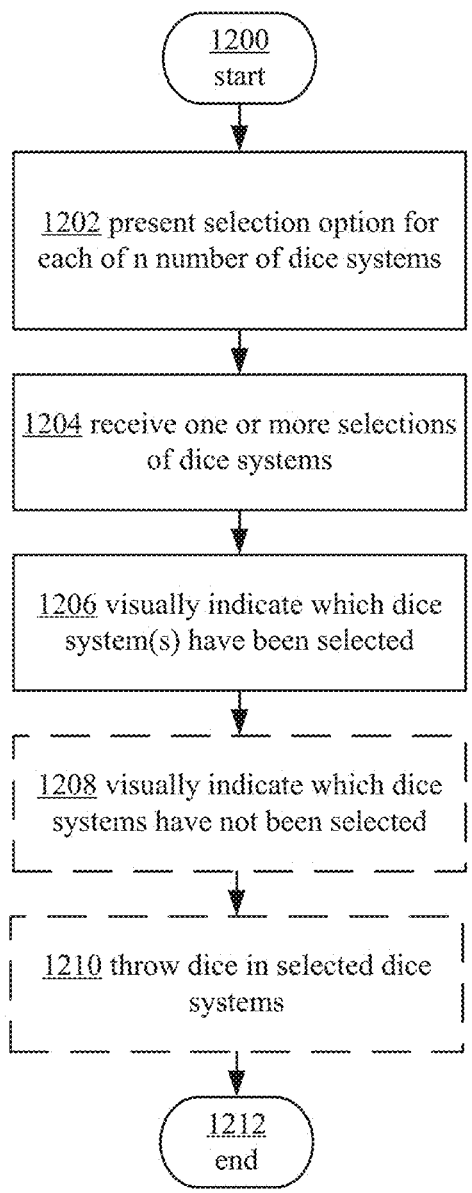
FIG. 12 depicts an example process for selecting at least one out of any number of dice systems for a gaming system or table.

FIG. 12 depicts an example process 1200 for selecting at least one out of any number of dice systems for a gaming system or table. Process 1200 may be used, for example in one or more gaming tables or cabinets that utilize more than one dice system, such as a Trio Dice game, as illustrated in FIG. 13B, a craps game, as illustrated in FIG. 13E, or other games utilizing multiple dice. Process 1200 may be executed by one or more controllers of a game table or console. In one example, a player may select one or more dice systems for throwing dice, via one or more user interface selection options, presented either as a graphical user interface on a display device associate with the gaming machine or table, or via one or more physical selection items, such as a button to switch. An example user interface for selecting one or more dice systems for throwing dice is illustrated in FIG. 14B. By providing the user the option to select which dice system(s) will be used to throw the dice, a more engaging and interactive user experience may be provided. In addition, by providing selection of one or more dice systems from a plurality of dice systems, the user may think he or she has more control over the play of the dice game, when in fact because the throw is randomly determined by a computer in advance of the throw, no more control is actually given.

Process 1200 may begin at operation 1202, where a selection option for each of n number of dice systems may be presented, for example, to a user. In some aspects, the selection options may include a button or area within a graphical user interface, for example, provided by a display device associated with the dice game table or console, or may include one or more physical buttons, as illustrated in FIG. 14B. Next, at operation 1204, the gaming system may receive one or more selections of dice systems for use in a current game. In some aspects, a gaming table may provide 2, 3, 4, 5, or other number Y of separate dice systems or generators. The gaming system may be configured to enable selection be a player of any number X of the Y dice systems. Upon receiving one or more selections from the player (or randomly by computer), the gaming system may visually indicate which X dice system(s) have been selected, at operation 1206. In some aspects, operation 1206 may include powering on one or more lights, LEDs, or other illumination source proximate to the selected dice system, such as the lighted cap 118 or other lighting below the dice system. In some aspects of process 1200, Z dice systems that are not selected may also be visually indicated, in contrast to the selected dice systems, at operation 1208. In some aspects, operation 1208 may include turning off all lights or illumination sources proximate to the un-selected dice system(s). In some cases, a smart film or shield as are known in the art may be provided over the glass/plastic of the dice canister, to block the dice from view, thus indicating that the dice system has been un-selected. In some systems, mechanical, electro-mechanical, or magnetic elevators could be used to lower un-selected dice system from being viewed at all by lowering the dice systems into the housing of the game, until the game is over than the dice systems are raised back up.

In some aspects of process 1200, the dice in the selected systems or canisters may be throw or rolled, at operation 1210. In some cases, where a player refused to select X dice or takes too long to do so, operation 1210 may be performed automatically, after a configurable time period, or even upon selection of the one or more dice systems. In other cases, the gaming system may receive a throw or roll selection prior to throwing the dice at operation 1210, at which process 1200 may end at 1212.

Figure 13A:
FIGS. 13A-13E depict example gaming machines in which a dice moving assembly may be implemented.
Figure 13B:
Figure 13C:
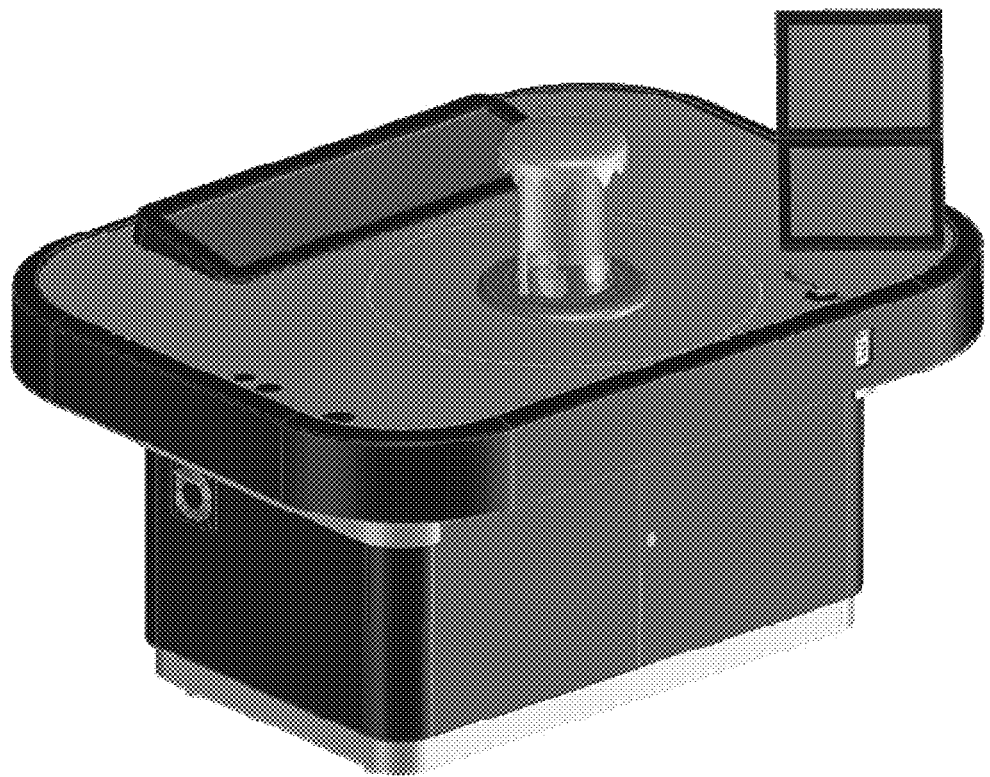
Figure 13D:
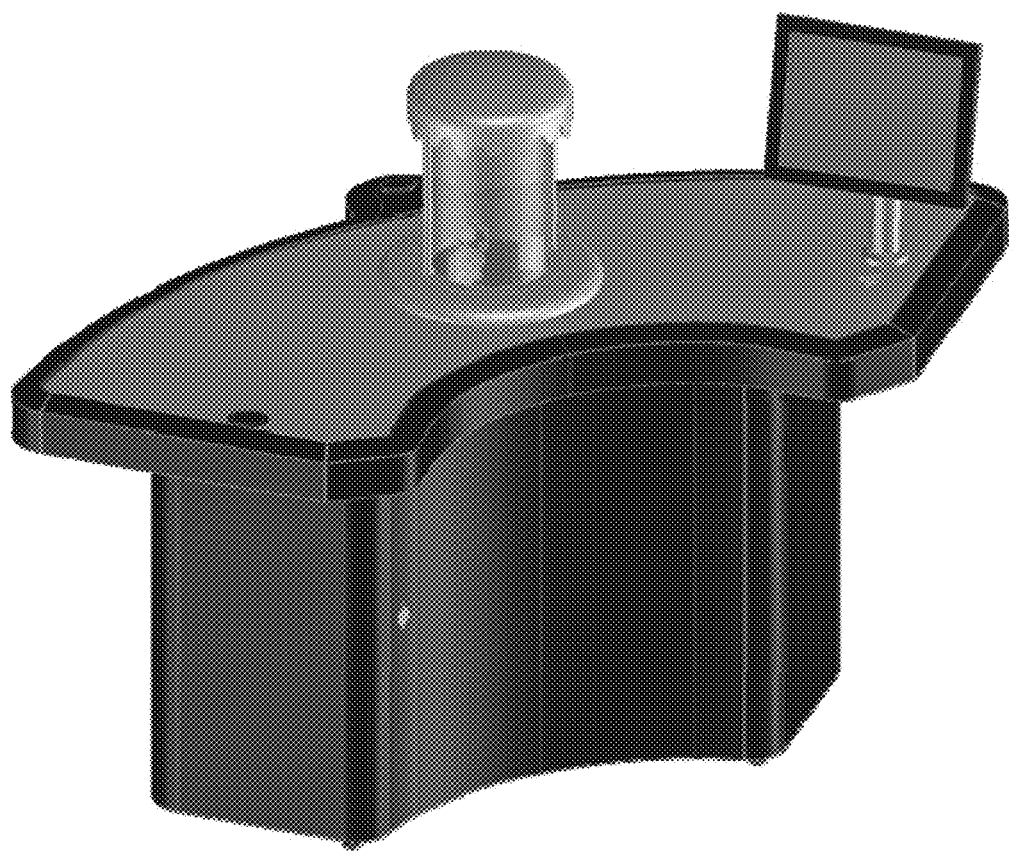
Figure 13E:
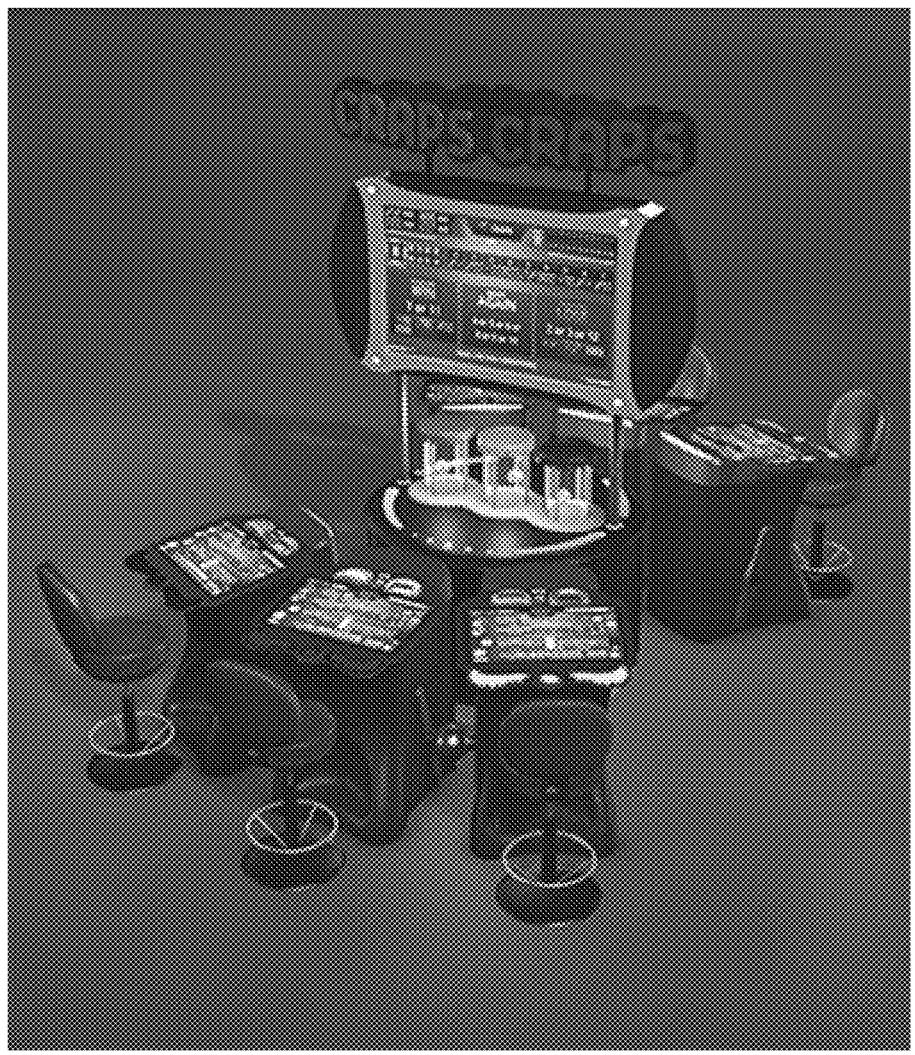

FIGS. 13A, 13B, 13C, 13D and 13E depict example gaming machines in which one or more dice systems described above may be implemented. FIG. 13A depicts a universal cabinet having a display with user controls and one dice system. The universal cabinet may be configured similar to a slot machine, in that the player may be presented a selection for starting a dice game and may control when the one or more dice of the dice system are thrown. In some aspects, due to requirements for precise control of the dice system, a random number generator may select one or more parameters for throwing the dice prior to the player activating the dice throw. Upon receiving a selection to initiate the dice throw, the dice system may then throw the dice according to the parameters dictated by the random number generator. In some cases, the dice system may vibrate the dice or possibly throw the dice, without affecting the final throw, to simulate that the player is actually controlling initiation of the dice throw, when in fact, the player is not.

FIG. 13B depicts a G5 Trio Dice table, having three separate dice systems 100. In the G5 Trio Dice game, a player may chose two out of three dice generators to play a dice game, such as craps. The player may place a bet on the score of one or both dice that will result when the dice are thrown by the selected two out of three dice systems or generators. In one example, the player may select an option to stop the dice while they are moving in the dice systems, although such stoppage is really a simulation and when the dice will actually stop is determined by the dice system 100 without interference or input from the player. In another example, the player may select an option to throw the dice, which throw is still randomly generated and not based on the player's actions at all. Bets would typically be made during a period prior to the dice being thrown and the placement of bets would be stopped before the dice could be thrown. In one modification, bets are not placed until the dice have been throw, but upon the dice being thrown a smart film or other covering may be used to shield the dice from view by the players until all of the bets have been made. Once bets are closed, the film may be removed to show the results of the dice throw.

FIG. 13C illustrates a modification of the universal cabinet, which may be referred to as a pulse table. FIG. 13D illustrates another example modification of a universal cabinet, which may be referred to herein as a live table. FIG. 13E illustrates an example of multiple play stations linked to a central display having a craps table with three dice systems.

Figure 14A:
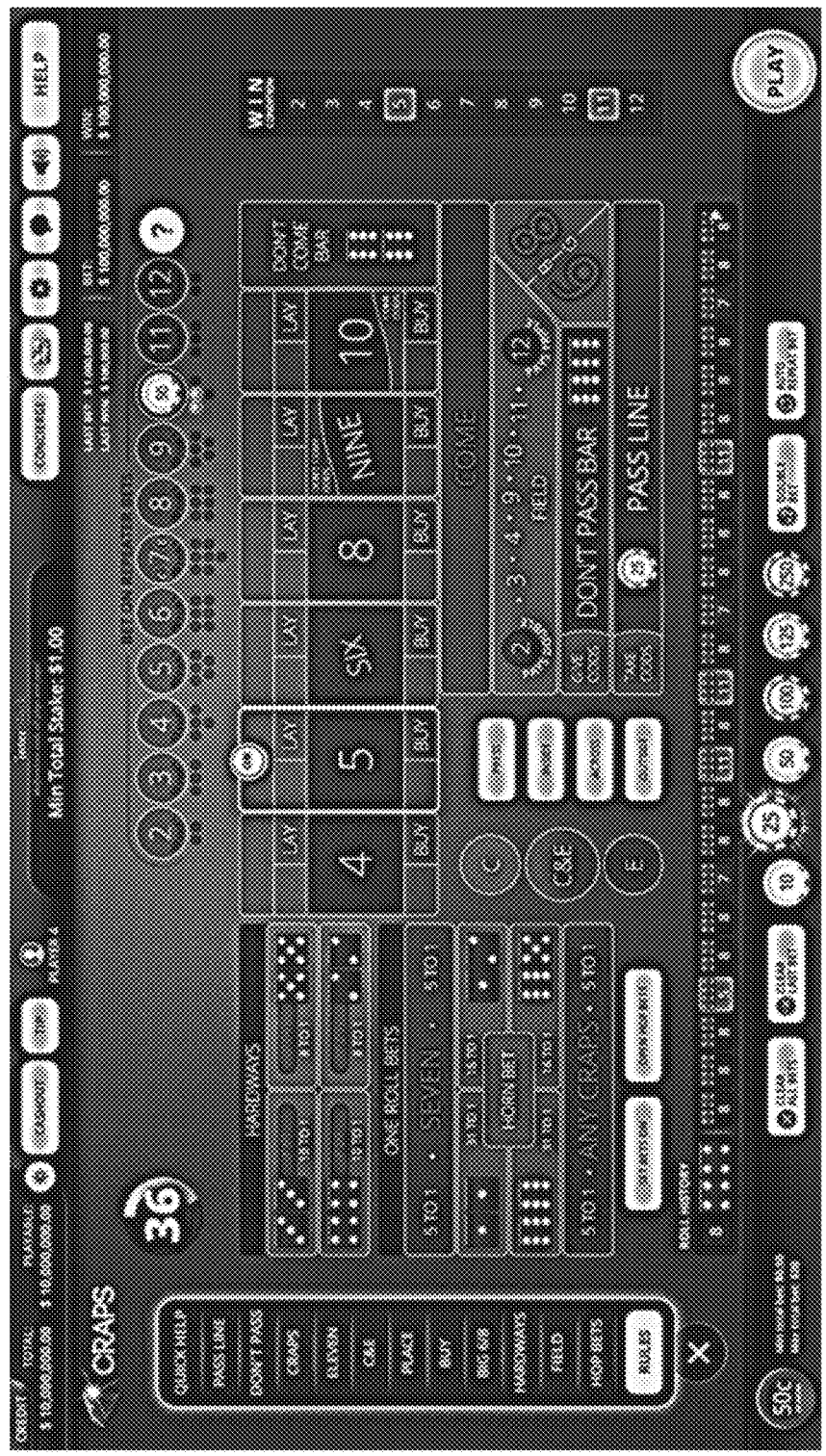
FIGS. 14A-14C depict example graphical user interfaces that may be used in conjunction with a dice system.
Figure 14B:
Figure 14C:
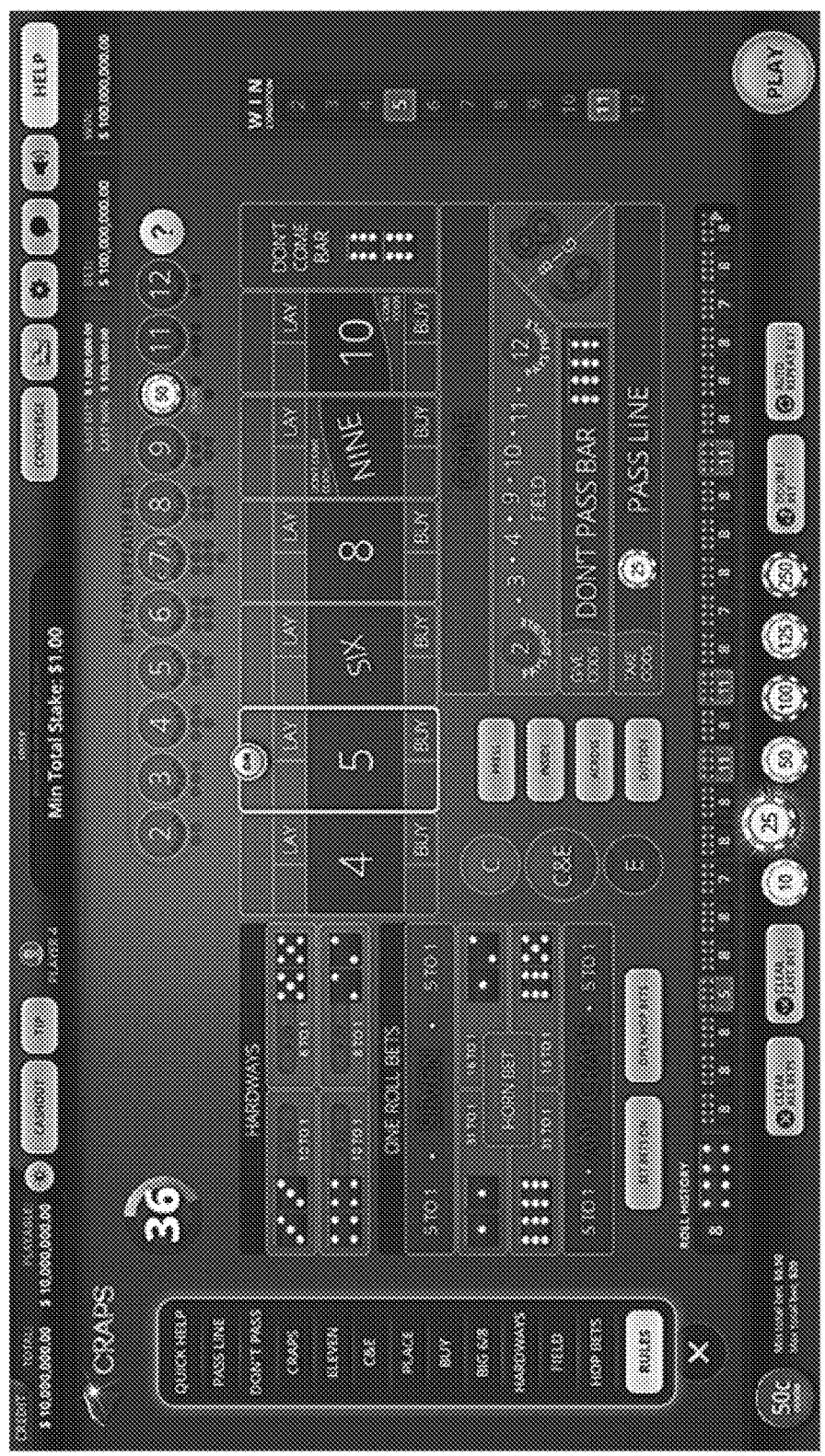

FIGS. 14A, 14B and 14C depict example graphical user interfaces that may be used in conjunction with a dice system 100 and/or gaming machines. FIGS. 14A and 14C depict user interface displays on a player's play station through which a player can make bets and play a game of craps in a manner very similar to how craps is played on a live craps game.

FIG. 14B illustrates example graphical user interfaces of the G5 Trio Dice game of FIG. 13B. When a player has been selected to be the shooter, they would see display screen 1402 indicating that the player was selected to be the shooter and directing the player to select 2 of the 3 dice systems. In another example, instead of three dice systems, the game could have 2, 4, 5 or n dice systems and the player could be selecting an x number of dice systems. Selecting X of the circles corresponding to the dice system on the display screen, either by touching the screen or using some other type of control device, such as a physical, optical or sensor-based device on the play station, such as a MAJESTIC button, results in highlighting of the selected circles and corresponding dice systems, as previously described. If the player does not do this soon enough, the selections may be randomly made. Once the dice systems have been selected, the player may then be given the option at display screen 1404 of pushing a button, such as the MAJESTIC button, to "initiate" the throw. Alternatively, as shown on display screen 1406, the option of "initiating" the throw may involve simply pushing a button on the display screen. Again, the dice throw itself is random, so the player's selection of a button of some type to initiate the throw may not actually initiate the throw. Rather the timing of the throw may be predetermined and tightly coupled to when the player is given the option to make the throw. If the user's selection is made before a predetermined time period expires, the selection may be communicated to the controller for the game and the throw may be initiated when it was randomly predetermined to be initiated. Likewise, if the player fails to make the throw in a timely manner, the controller may initiate the throw according the randomly predetermined time.

Figure 15:
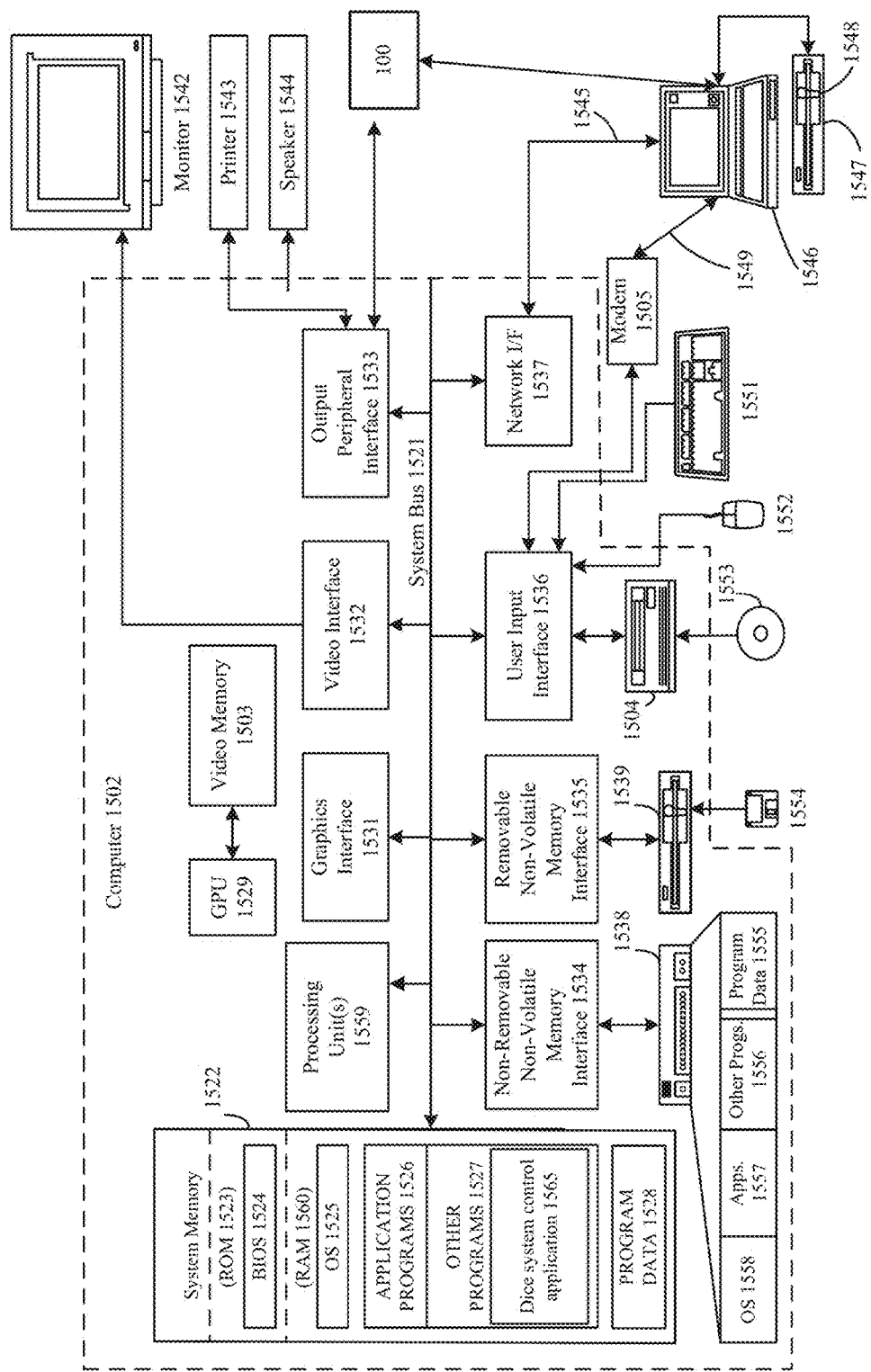
FIG. 15 depicts an example computing environment in which the described systems and processes may be implemented.

In some aspects, dice system 100 and/or one or more of the above-described processes may be implemented using one or more computing devices or environments, as described below. FIG. 15 depicts an example general purpose computing environment, for example, that may embody one or more aspects of a local dice system controller associated with an individual (or three) instance of dice system 150 and/or a centralized dice system that may communicate with dice system 100 over one or more wired or wireless communication networks. The computing system environment 1502 is only one example of a suitable computing environment and is not intended to suggest any limitation as to the scope of use or functionality of the presently disclosed subject matter. Neither should the computing environment 1502 be interpreted as having any dependency or requirement relating to any one or combination of components illustrated in the example operating environment 1502. In some embodiments the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function (s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 1502, which may include any of a mobile device or smart phone, tablet, laptop, desktop computer, or collection of networked devices, cloud computing resources, etc., typically includes a variety of computer-readable media. Computer-readable media can be any available media that can be accessed by computer 1502 and includes both volatile and nonvolatile media, removable and non-removable media. The system memory 1522 includes computer-readable storage media in the form of volatile and/or nonvolatile memory such as read only memory (ROM) 1523 and random access memory (RAM) 1560. A basic input/output system 1524 (BIOS), containing the basic routines that help to transfer information between elements within computer 1502, such as during start-up, is typically stored in ROM 1523. RAM 1560 typically contains data and/or program modules that are immediately accessible to and/or presently being operated on by processing unit 1559. By way of example, and not limitation, FIG. 15 illustrates operating system 1525, application programs 1526, other program modules 1527 including a dice system control application 1565, and program data 1528.

The computer 1502 may also include other removable/non-removable, volatile/nonvolatile computer storage media. By way of example only, FIG. 15 illustrates a hard disk drive 1538 that reads from or writes to non-removable, nonvolatile magnetic media, a magnetic disk drive 1539 that reads from or writes to a removable, nonvolatile magnetic disk 1554, and an optical disk drive 1504 that reads from or writes to a removable, nonvolatile optical disk 1553 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 1538 is typically connected to the system bus 1521 through a non-removable memory interface such as interface 1534, and magnetic disk drive 1539 and optical disk drive 1504 are typically connected to the system bus 1521 by a removable memory interface, such as interface 1535 or 1536.

The drives and their associated computer storage media discussed above and illustrated in FIG. 15, provide storage of computer-readable instructions, data structures, program modules and other data for the computer 1502. In FIG. 15, for example, hard disk drive 1538 is illustrated as storing operating system 1558, application programs 1557, other program modules 1556, and program data 1555. Note that these components can either be the same as or different from operating system 1525, application programs 1526, other program modules 1527, and program data 1528. Operating system 1558, application programs 1557, other program modules 1556, and program data 1555 are given different numbers here to illustrate that, at a minimum, they are different copies. A user may enter commands and information into the computer 1502 through input devices such as a keyboard 1551 and pointing device 1552, commonly referred to as a mouse, trackball or touch pad. Other input devices (not shown) may include a microphone, joystick, game pad, satellite dish, scanner, retinal scanner, or the like. These and other input devices are often connected to the processing unit 1559 through a user input interface 1536 that is coupled to the system bus 1521, but may be connected by other interface and bus structures, such as a parallel port, game port or a universal serial bus (USB). A monitor 1542 or other type of display device is also connected to the system bus 1521 via an interface, such as a video interface 1532. In addition to the monitor, computers may also include other peripheral output devices such as speakers 1544 and printer 1543, which may be connected through an output peripheral interface 1533.

The computer 1502 may operate in a networked environment using logical connections to one or more remote computers, such as a remote computer 1546. The remote computer 1546 may be a personal computer, a server, a router, a network PC, a peer device or other common network node, and typically includes many or all of the elements described above relative to the computer 1502, although only a memory storage device 1547 has been illustrated in FIG. 15. The logical connections depicted in FIG. 15 include a local area network (LAN) 1545 and a wide area network (WAN) 1549, but may also include other networks. Such networking environments are commonplace in offices, enterprise-wide computer networks, intranets, the Internet, and cloud computing resources.

When used in a LAN networking environment, the computer 1502 is connected to the LAN 1545 through a network interface or adapter 1537. When used in a WAN networking environment, the computer 1502 typically includes a modem 1505 or other means for establishing communications over the WAN 1549, such as the Internet. The modem 1505, which may be internal or external, may be connected to the system bus 1521 via the user input interface 1536, or other appropriate mechanism. In a networked environment, program modules depicted relative to the computer 1502, or portions thereof, may be stored in the remote memory storage device. By way of example, and not limitation, FIG. 15 illustrates remote application programs 1548 as residing on memory device 1547. It will be appreciated that the network connections shown are example and other means of establishing a communications link between the computers may be used.

In some aspects, other programs 1527 may include a dice system control application 1565 that includes the functionality as described above. In some cases, dice system control application 1565, may execute some or all operations of processes 800, 1000, 1100, and/or 1200. In some aspects, computing device 100 may also communicate with one or more dice systems 100.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage. The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. For purposes of this specification and the claims, the phrase "computer-readable storage medium" and variations thereof, does not include waves, signals, and/or other transitory and/or intangible communication media. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

In an embodiment, a method for calibrating displacement of a platform for throwing dice in a dice gaming system comprises configuring a displacement by which the platform will move in order to cause the dice resting on the platform to rise to a height above the platform, wherein the height of the dice above the platform is associated with at least one dice throw parameter; applying at least a force to the platform based on the configured displacement; measuring an actual displacement of the platform as a result of the applied force; comparing the configured displacement with the measured actual displacement to determine a displacement delta; and adjusting at least one dice throw parameter based on the comparison to decrease the displacement delta for future throws of the one or more dice.

In the embodiment, the method further comprises obtaining historic information of at least one previous throw of the dice, wherein adjusting the at least one dice throw parameter is further based on the historic information. In the embodiment, the historic information includes one or more of the at least one dice throw parameter, the configured displacement, the measured actual displacement, the displacement delta, and the adjusted dice throw parameter. In the embodiment, the at least one dice throw parameter comprises at least one of a first upward force, a second upward force, a time between the first upward force and the second upward force, and at least one displacement between the first upward force and the second upward force. In the embodiment, measuring includes using a displacement sensor to measure displacement of the platform.

In the embodiment, the method further comprises measuring a temperature of one or more components of the dice gaming system; and shutting down the dice gaming system if the temperature exceeds a predetermined threshold. In the embodiment, the method further comprises obtaining a configured dice throw height; measuring the dice throw height during the throw of the at least one dice; comparing the configured dice height with the measured actual dice height to determine a dice throw delta; and adjusting the at least one dice throw parameter further based on the dice throw delta to decrease the dice throw delta. In the embodiment, measuring the dice throw height includes using an optical sensor to measure an actual height of the dice. In the embodiment, the optical sensor is a camera. In the embodiment, measuring the dice throw height includes using a pressure sensor to determine a period of time during which the dice is not in contact with the platform. In the embodiment, the method further comprises generating the at least one dice throw parameter randomly prior to the throw.

In an embodiment, a method for calibrating dice throws for a dice gaming system comprises configuring an intended dice throw height; measuring an actual dice throw height during a throw of a dice; comparing the configured intended dice height with the measured actual dice height to determine a dice throw height delta; and adjusting at least one dice throw parameter of the dice gaming system based on the dice throw height delta to decrease the dice throw height delta.

In the embodiment, the method further comprises obtaining historic information of at least one previous throw of the dice, wherein adjusting the at least one dice throw parameter is further based on the historic information. In the embodiment, the historic information includes one or more of the at least one dice throw parameter, the configured intended dice throw height, the measured actual dice throw height, the dice throw height delta, and the adjusted dice throw parameter. In the embodiment, the at least one dice throw parameter comprises at least one of a first upward force on the dice, a second upward force on the dice, a time between the first upward force and the second upward force, and at least one displacement between the first upward force and the second upward force. In the embodiment, measuring includes using a displacement sensor to measure displacement of the platform. In the embodiment, measuring the dice throw height includes using an optical sensor to measure an actual dice throw height of the dice. In the embodiment, the optical sensor is a camera. In the embodiment, measuring the dice throw height includes using a pressure sensor to determine a period of time during which the dice is not in contact with the platform. In the embodiment, the method further comprises generating the at least one dice throw parameter randomly prior to the throw.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the disclosure. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of certain of the disclosure.

What is claimed is:

1. A method for calibrating displacement of a platform for throwing dice in a dice gaming system, the method comprising:
   configuring a displacement by which the platform will move, limited in a vertical direction, in order to cause the dice resting on the platform to rise to a height above the platform, wherein the height of the dice above the platform is associated with at least one dice throw parameter;
   applying at least a force to the platform based on the configured displacement;
   measuring an actual displacement of the platform as a result of the applied force;
   comparing the configured displacement with the measured actual displacement to determine a displacement delta; and
   adjusting the at least one dice throw parameter based on the comparison to decrease the displacement delta for future throws of the one or more dice.

2. The method of claim 1, further comprising obtaining historic information of at least one previous throw of the dice, wherein adjusting the at least one dice throw parameter is further based on the historic information.

3. The method of claim 2, wherein the historic information includes one or more of the at least one dice throw parameter, the configured displacement, the measured actual displacement, the displacement delta, and the adjusted dice throw parameter.

4. The method of claim 1, wherein the at least one dice throw parameter comprises at least one of a first upward force, a second upward force, a time between the first upward force and the second upward force, and at least one displacement between the first upward force and the second upward force.

5. The method of claim 1, wherein measuring includes using a displacement sensor to measure displacement of the platform.

6. The method of claim 1, further comprising:
   measuring a temperature of one or more components of the dice gaming system; and
   shutting down the dice gaming system if the temperature exceeds a predetermined threshold.

7. The method of claim 1, further comprising:
   obtaining a configured dice throw height;
   measuring the dice throw height during the throw of the at least one dice;
   comparing the configured dice height with the measured actual dice height to determine a dice throw delta; and
   adjusting the at least one dice throw parameter further based on the dice throw delta to decrease the dice throw delta.

8. The method of claim 7, wherein measuring the dice throw height includes using an optical sensor to measure an actual height of the dice.

9. The method of claim 8, wherein the optical sensor is a camera.

10. The method of claim 7, wherein measuring the dice throw height includes using a pressure sensor to determine a period of time during which the dice is not in contact with the platform.

11. The method of claim 1, further comprising generating the at least one dice throw parameter randomly prior to the throw.

12. A method for calibrating dice throws for a dice gaming system, the method comprising:
   configuring an intended dice throw height;
   measuring an actual dice throw height by a driven platform limited in a vertical direction during a throw of a dice;
   comparing the configured intended dice height with the measured actual dice height to determine a dice throw height delta; and
   adjusting at least one dice throw parameter of the dice gaming system based on the dice throw height delta to decrease the dice throw height delta.

13. The method of claim 12, further comprising obtaining historic information of at least one previous throw of the dice, wherein adjusting the at least one dice throw parameter is further based on the historic information.

14. The method of claim 13, wherein the historic information includes one or more of the at least one dice throw parameter, the configured intended dice throw height, the measured actual dice throw height, the dice throw height delta, and the adjusted dice throw parameter.

15. The method of claim 12, wherein the at least one dice throw parameter comprises at least one of a first upward force on the dice, a second upward force on the dice, a time between the first upward force and the second upward force, and at least one displacement between the first upward force and the second upward force.

16. The method of claim 12, wherein measuring includes using a displacement sensor to measure displacement of the platform.

17. The method of claim 12, wherein measuring the dice throw height includes using an optical sensor to measure an actual dice throw height of the dice.

18. The method of claim 17, wherein the optical sensor is a camera.

19. The method of claim 12, wherein measuring the dice throw height includes using a pressure sensor to determine a period of time during which the dice is not in contact with the platform.

20. The method of claim 12, further comprising generating the at least one dice throw parameter randomly prior to the throw.

21. The method of claim 1, wherein the force applied to the platform is applied by a magnetic motor and wherein the platform is limited from moving in the vertical direction by magnetic movement limiters.

22. The method of claim 1, wherein the driven platform is driven by a magnetic motor and wherein the driven platform is limited from moving in the vertical direction by magnetic movement limiters.

* * * * *